(12) United States Patent
Zhu et al.

(10) Patent No.: US 10,313,174 B2
(45) Date of Patent: Jun. 4, 2019

(54) METHOD AND AUXILIARY METHOD, APPARATUS BASE STATION AND USER EQUIPMENT FOR INTERFERENCE CANCELLATION

(71) Applicant: Samsung Electronics Co., Ltd., Suwon-si (KR)

(72) Inventors: Dalin Zhu, Beijing (CN); Bin Yu, Beijing (CN); Pengfei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/545,672

(22) PCT Filed: Jan. 25, 2016

(86) PCT No.: PCT/KR2016/000770
§ 371 (c)(1),
(2) Date: Jul. 21, 2017

(87) PCT Pub. No.: WO2016/117980
PCT Pub. Date: Jul. 28, 2016

(65) Prior Publication Data
US 2018/0019905 A1    Jan. 18, 2018

(30) Foreign Application Priority Data
Jan. 23, 2015 (CN) .......................... 2015 1 0033772

(51) Int. Cl.
*H04L 27/26* (2006.01)
*H04B 7/0452* (2017.01)
(Continued)

(52) U.S. Cl.
CPC ....... *H04L 27/2698* (2013.01); *H04B 7/0452* (2013.01); *H04J 11/0023* (2013.01);
(Continued)

(58) Field of Classification Search
CPC .. H04B 7/0452; H04J 11/0023; H04L 1/0053; H04L 1/0054; H04L 27/2615;
(Continued)

(56) References Cited

U.S. PATENT DOCUMENTS

| 7,106,813 B1* | 9/2006 | Ling | H04L 1/005 |
| | | | 375/144 |
| 2012/0213001 A1* | 8/2012 | Yang | G06F 11/1048 |
| | | | 365/185.2 |

(Continued)

FOREIGN PATENT DOCUMENTS

| CN | 102237955 A | 11/2011 |
| CN | 102820938 A | 12/2012 |

(Continued)

OTHER PUBLICATIONS

International Search Report dated Jun. 2, 2016 in connection with International Patent Application No. PCT/KR2016/000770.

(Continued)

*Primary Examiner* — Michael R Neff

(57) ABSTRACT

The present disclosure provides a method for interference cancellation which includes: calculating a mean value and a variance value of a received signal to obtain statistics information of the received signal; calculating an estimating log-likelihood ratio using the statistics information of the received signal; calculating a decoding log-likelihood ratios of the received signal using the estimating log-likelihood ratio of the received signal, and performing calculations to update the statistics information of the received signal; repeating the above steps for a pre-determined number of times, performing hard decisions on the decoding log-likelihood ratios of the received signal, and outputting data bits obtained from the hard decision. The present disclosure also provides an apparatus, an auxiliary method, a base station and a terminal device for interference cancellation.

(Continued)

The mechanism of the present disclosure can reduce the impact of inherent interference in the FBMC/OQAM system on system performances, and increase spectral efficiency and design flexibility of the FBMC/OQAM system.

19 Claims, 25 Drawing Sheets

(51) Int. Cl.
  *H04J 11/00* (2006.01)
  *H04L 1/00* (2006.01)
  *H04L 27/36* (2006.01)
(52) U.S. Cl.
  CPC .......... *H04L 1/0054* (2013.01); *H04L 27/264* (2013.01); *H04L 27/2647* (2013.01); *H04L 27/366* (2013.01); *H04L 1/0053* (2013.01); *H04L 27/2615* (2013.01)
(58) Field of Classification Search
  CPC ............... H04L 27/264; H04L 27/2647; H04L 27/2698; H04L 27/366
  USPC ........................................................ 375/262
  See application file for complete search history.

(56) References Cited

U.S. PATENT DOCUMENTS

| 2013/0215841 | A1 | 8/2013 | Sun et al. |
| 2015/0372843 | A1* | 12/2015 | Bala ................. H04L 25/03834 375/295 |
| 2016/0218781 | A1* | 7/2016 | Seifert ................. H04B 7/0417 |

FOREIGN PATENT DOCUMENTS

| WO | 01/69873 A2 | 9/2001 |
| WO | 2014/123926 A1 | 8/2014 |

OTHER PUBLICATIONS

Written Opinion of the International Searching Authority dated Jun. 2, 2016 in connection with International Patent Application No. PCT/KR2016/000770.

Marius Caus et al., "Low-complexity soft-output MIMO detection in FBMC/OQAM systems", Proceedings of the 18th International Conference on Communications (part of CSCC '14), Jul. 17-21, 2014, 8 pages.

* cited by examiner

FIG. 14

| | n = -4 | n = -3 | n = -2 | n = -1 | n = 0 | n = 1 | n = 2 | n = 3 | n = 4 |
|---|---|---|---|---|---|---|---|---|---|
| k = -2 | 0 | 0.0086j | -0.0001j | 0 | 0 | 0 | -0.0001j | 0.0086j | 0 |
| k = -1 | 0.0054j | 0.0429j | -0.01250j | -0.2058j | 0.2393j | 0.2058j | -0.01250j | -0.0429j | 0.0054j |
| k = 0 | 0 | -0.0668j | 0.0023j | 0.5644j | 1 | 0.5644j | 0.0023j | -0.0668j | 0 |
| k = 1 | 0.0054j | -0.0429j | -0.01250j | 0.2058j | 0.2393j | -0.2058j | -0.01250j | 0.0429j | 0.0054j |
| k = 2 | 0 | 0.0086j | -0.0001j | 0 | 0 | 0 | -0.0001j | 0.0086j | 0 |

METHOD AND AUXILIARY METHOD, APPARATUS BASE STATION AND USER EQUIPMENT FOR INTERFERENCE CANCELLATION

CROSS-REFERENCE TO RELATED APPLICATION(S)

The present application claims priority under 35 U.S.C. § 365 to International Patent Application No. PCT/KR2016/000770 filed Jan. 25, 2016, which claims priority to Chinese Patent Application No. 201510033772.X filed Jan. 23, 2015, each of which are incorporated herein by reference into the present disclosure as if fully set forth herein.

TECHNICAL FIELD

The present disclosure relates to wireless communications, and particularly to a method and an auxiliary method, an apparatus, a base station and a user equipment for interference cancellation.

BACKGROUND

The new generation mobile communication system features simplified network architecture, very low transmission/processing delay, high quality communications, high data rates and the like. Multi-carrier modulation (MCM) is regarded as one of key techniques in contemporary and future mobile communication systems. Orthogonal frequency division multiplexing (OFDM), a typical MCM scheme, has been widely used in fields of audio/video broadcasting and commercial communication systems, such as Digital Video Broadcasting (DVB) and Digital Audio Broadcasting (DAB) in Europe, Very-high-bit-rate Digital Subscriber Loop (VDSL), Power Line Communication (PLC), IEEE802.11a/g Wireless Local Area (WLAN), IEEE802.22 Wireless Regional Area Network (WRAN), IEEE802.16 World Interoperability for Microwave Access (WiMAX), and 3GPP Long Term Evolution (LTE) for Evolved Universal Terrestrial Radio Access (E-UTRA) systems, and the like.

The OFDM technique transforms a broadband channel into several parallel narrowband sub-channels, thus a high rate data stream transmitted in a frequency-selective fading channel is transformed into several low rate data streams transmitted on several parallel flat-fading sub-carriers. This can greatly enhance the system's capability in combating with the interference brought by the multi-path propagation channel. Further, Cyclic Prefix (CP) is adopted to transform linear convolution operations into circular convolution operations. According to characteristics of the circular convolution, when the length of CP is greater than the maximum channel delay spread, inter-symbol interference (ISI)-free channel equalization can be attained by using simple frequency domain zero forcing technique. The complexity of channel equalization is therefore remarkably reduced. Further, compared with conventional frequency division multiplexing (FDM) multi-carrier systems, OFDM systems allow overlapped sub-carriers as long as an orthogonality condition is satisfied, need no guard band, and require less demodulators on the receiver side. Thus, OFDM has advantages such as high spectral efficiency, simple receivers and low-cost hardware, and so on. Moreover, OFDM systems are very flexible in designing multiple access (MA) schemes and performing power allocation because the sub-carriers are independent to each other.

Conventional CP-OFDM scheme, however, has disadvantages in the following aspects.

(1) The usage of CP reduces the system power efficiency. Although the CP can effectively counteract the ISI, it consumes a portion of transmitting power and thus reduces the power efficiency of the transmitter. When the delay spread in a channel is greater than the length of the CP, there is still serious ISI.

(2) The system is very sensitive to carrier frequency offset (CFO).

(3) The relatively high peak-to-average power ratio (PAPR) places high requirements for the dynamic range of RF power amplifiers at the transmitter.

(4) The system has significant out of band emission. In order to solve the problem, sub-carriers close to the spectrum boundaries are often nulled, and this leads to reduced spectral efficiency and data transmission efficiency of the system.

The above disadvantages are mainly resulted from inherent characteristics of the OFDM system. Although methods can be taken to mitigate the adverse effects of the disadvantages, this increases the complexity in system design, and is not able to completely solve the problems. In this context, several other new MCM techniques have drawn close attention and are widely studied from multiple perspectives such as introducing filters having excellent time frequency localization (TFL) characteristics, increasing the distance between time-frequency grid points, changing the orthogonality condition, and so on. A typical system that has the above characteristics is the filter bank multi-carrier/offset quadrature amplitude modulation (FBMC/OQAM) system, which is also referred to as the OFDM/OQAM system.

The FBMC/OQAM system separately transmits a real part and an imaginary part of a complex symbol obtained from QAM mappings. The real part and the imaginary part of a complex symbol have an offset of half an FBMC symbol interval in between. The FBMC/OQAM system does not satisfy the orthogonality condition in the complex field, thus strictly speaking, it belongs to the category of non-orthogonal systems. However, the FBMC/OQAM system strictly satisfies the real-field orthogonality condition. As such, the FBMC/OQAM system can be regarded as a quasi-orthogonal system between an orthogonal system and a non-orthogonal system. Thus, relaxing the orthogonality condition to the real fields permits the use of filter banks with excellent TFL characteristics to trade-off between orthogonality and interference mitigation capabilities, and enables the FBMC/OQAM system to have good anti-interference ability. In general, the FBMC/OQAM technique not only maintains the orthogonality which simplifies the system design, but also adopts filter banks with excellent TFL characteristics to enhance the anti-interference ability of the system. These advantages make the FBMC/OQAM technique one of main candidate techniques for the 5th Generation Mobile Communications System.

Specifically, the FBMC/OQAM system has the following advantages.

(1) High spectral efficiency and power efficiency. Compared with CP-OFDM systems, in one OFDM symbol period, the FBMC/OQAM system transmits two real symbols (equivalent to one complex symbol). When CP is not taken into consideration, the FBMC/OQAM system has the same spectral efficiency and power efficiency with conventional OFDM systems. When CP is taken into consideration, the FBMC/OQAM system has higher spectral efficiency and effective transmitting power than CP-OFDM systems.

(2) Possession of both the anti ISI ability and the anti inter-carrier interference (ICI) ability. In the FBMC/OQAM system, relaxing the orthogonality condition from the complex field to the real fields permits the use of filter banks. Filter banks with excellent performances can provide good localization in both time and frequency, thus enable the FBMC/OQAM system to have both the anti ISI ability and the anti ICI ability without using CP.

(3) Low implementation complexity. The receiver of FBMC/OQAM system has lower complexity than non-orthogonal systems because it is still an orthogonal system. Furthermore, the FBMC/OQAM system can be implemented using Inverse Fast Fourier Transform (IFFT) and Fast Fourier Transform (FFT) to further reduce the design and implementation complexity of the system.

There are also some challenges in employing the FBMC/OQAM technique.

(1) Channel estimation is relatively difficult. The FBMC/OQAM system strictly satisfies the orthogonality condition only in the real fields, inherent interference exists between base functions of filter banks. The interference is imaginary-valued interference and can be eliminated by taking real parts of the received signal after channel equalization. But in the context of complex channel, the estimated channel is a superposition value of the inherent interference and the actual channel. When the data information around the pilot point is unknown, it is hard to eliminate the inherent interference which seriously affects the channel estimation accuracy.

(2) The system has high PAPR. The high PAPR is a result of the superposition of multiple signals, thus is an intrinsic characteristic of multi-carrier systems. As an MCM technique, FBMC/OQAM signal also has high PAPR.

(3) The processing procedures at the receiver side regarding equalization and demodulation are relatively complex. Received signal includes a complex interference component which cannot be completely eliminated by simply taking real parts. Residual interference is usually eliminated by interference estimation and cancellation, which would increase design complexity of the system. Moreover, since real parts and imaginary parts of complex data are transmitted separately, and then processed and synthesized at the receiver side. This procedure also increases the implementation complexity of the system. In addition, existence of the inherent interference makes it rather complex to integrate the FBMC/OQAM system with other systems such as multi-input multi-output (MIMO).

SUMMARY

Therefore, there is still no effective and low complexity solution to cancel and counteract with residual inherent interference in the FBMC/OQAM system. An effective and feasible receiver for interference cancellation with reduced system design complexity is needed to improve spectral efficiency and design flexibility of the FBMC/OQAM system and to enhance the competitiveness of the FBMC/OQAM technique as one of candidate techniques for the $5^{th}$ generation wireless systems.

A method for interference cancellation, comprising:

step 1: calculating a mean value and a variance value of a received signal to obtain statistics information of the received signal;

step 2: calculating an estimating log-likelihood ratio of the received signal using the statistics information;

step 3: calculating a decoding log-likelihood ratio of the received signal using the estimating log-likelihood ratio of the received signal, and updating calculations of the statistics information of the received signal;

step 4: repeating the step 1 to step 3 for a pre-determined number of times, performing hard decisions on the decoding log-likelihood ratio of the received signal, and outputting data bits obtained from the hard decisions.

In an example, the method is applicable for canceling ISI and ICI in an SISO FBMC/OQAM system or in a MIMO FBMC/OQAM system or in a distributed multi-antenna FBMC/OQAM system.

In an example, the calculating a mean value and a variance value of a received signal in step 1 comprises one of:

manner 1: calculating a mean value and a variance value of the received signal after interference post-processing;

manner 2: calculating a mean value and a variance value of the received signal after interference pre-processing.

In an example, the method may also include the following steps to obtain the received signal after interference post-processing:

processing the received signal through matched filtering, channel equalization, synthesizing, and taking real part to obtain an initialized signal;

processing the initialized signal through symbol-level hard decisions based on minimum Euclidean distance to obtain a hard decision signal;

processing the hard decision signal through demodulation, parallel to serial conversion, de-interleaving and channel decoding to obtain a processed signal, processing the processed signal through channel encoding, interleaving, serial to parallel conversion, QAM modulation and taking real/imaginary part to obtain an estimated signal;

performing initial interference cancellation using the initialized signal and the estimated signal to obtain the received signal after the interference post-processing.

In an example, the initial interference cancellation is expressed as:

$$\tilde{d}'_{k_0,n_0} = \tilde{d}_{k_0,n_0} - \Re\left\{\sum_{n_r=1}^{N_R}\sum_{n_t=1}^{N_T}\sum_{(k,n)\in\Omega_{(k_0,n_0)}} \hat{d}'_{k,n}(\phi^{(n_t,n_r)}_{k_0,n_0})^* h^{(n_t,n_r)}_{k,n} \sum_{m=-\infty}^{\infty} g_{k,n}[m]f_{k_0,n_0}[m]\right\}$$

wherein, $(k_0,n_0)$ is a target time-frequency grid point, $(k,n)$ is a neighboring time-frequency grid point of the target time-frequency grid point, $\Re\{\bullet\}$ denotes taking a real part, $\tilde{d}'_{k_0,n_0}$ is a signal after interference post-processing at the target time-frequency grid point, $\tilde{d}_{k_0,n_0}$ is an initialized signal of the target time-frequency grid point $(k_0,n_0)$, $\hat{d}'_{k,n}$ is an estimated signal at the time-frequency grid point $(k,n)$, $h_{k,n}^{(n_t,n_r)}$ is a frequency response of a channel between a receive antenna $n_r$ and a transmit antenna $n_t$ at the time-frequency grid point $(k,n)$, $\phi_{k_0,n_0}^{(n_t,n_r)}$ is a channel equalization coefficient of the channel between the receive antenna $n_r$ and the transmit antenna $n_t$ at the time-frequency grid point $(k_0,n_0)$, $g_{k,n}[m]$ is a filtering function of a synthesis filter at the time-frequency grid point $(k,n)$, $f_{k_0,n_0}[m]$ is a filtering function of an analysis filter at the time-frequency grid point $(k_0,n_0)$, m is a sampling index of a filter, $N_T$ ($N_T \geq 1$) is the number of transmit antennas, $N_R$ ($N_R \geq 1$) is the number of receive antennas, $\Omega_{k_0,n_0}$ is a neighborhood of the target time-frequency grid point $(k_0,n_0)$.

In an example, wherein the initial interference cancellation includes an iterative process.

In an example, the method may also include the following steps to obtain the received signal after interference pre-processing:

processing the received signal through matched filtering to obtain a filtered signal;

processing the filtered signal through channel equalization, synthesizing and taking imaginary part to obtain estimated interference in the initialized signal;

performing initial interference cancellation operations using the filtered signal and the estimated interference to obtain the received signal after initial interference pre-processing;

performing soft demodulation/decision on the received signal after the interference pre-processing to obtain a posteriori log-likelihood ratio of the received signal;

processing the posteriori log-likelihood ratio through parallel to serial conversion, de-interleaving and channel decoding to obtain a processed signal, and processing the processed signal through channel encoding, interleaving, serial to parallel conversion, QAM modulation and taking real/imaginary part to obtain the received signal after the interference pre-processing.

In an example, the initial interference cancellation is expressed as:

$$\bar{y}_{k_0,n_0} = y_{k_0,n_0} - \sum_{n_r=1}^{N_R} \sum_{n_t=1}^{N_T} \sum_{(k,n) \in \Omega_{(k_0,n_0)}} j h_{k,n}^{(n_t,n_r)} \tilde{u}_{k_0,n_0}$$

wherein, $(k_0,n_0)$ is a target time-frequency grid point, $(k,n)$ is a neighboring time-frequency grid point of the target time-frequency grid point, $\bar{y}_{k_0,n_0}$ is a signal after the initial interference pre-processing at the time-frequency grid point $(k_0,n_0)$, $y_{k_0,n_0}$ is a filtered signal at the target time-frequency grid point $(k_0,n_0)$, $h_{k,n}^{(n_t,n_r)}$ is a frequency response of a channel between a receive antenna $n_r$ and a transmit antenna $n_t$ at the time-frequency grid point $(k,n)$, $\tilde{u}_{k_0,n_0}$ is the estimated interference in the initialized signal at the time-frequency grid point $(k_0,n_0)$ $N_T$ ($N_T \geq 1$) is the number of transmit antennas, $N_R$ $N_R \geq 1)$ is the number of receive antennas, $\Omega_{k_0,n_0}$ is a neighborhood of the target time-frequency grid point $(k_0,n_0)$.

In an example, the initial interference cancellation comprises an iterative process.

In an example, the calculating the estimating log-likelihood ratio of the received signal in step 2 is expressed as:

$$\Xi(b_{k_0,n_0}(u)) = \log \left[ \frac{\sum_{\{q_u=+1|q \in 1,2,\ldots,2^Q\}} P(\tilde{d}_{k_0,n_0} \mid d_{k_0,n_0} = a_q)}{\sum_{\{q_u=-1|q \in 1,2,\ldots,2^Q\}} P(\tilde{d}_{k_0,n_0} \mid d_{k_0,n_0} = a_q)} \right]$$

wherein, $$P(\tilde{d}_{k_0,n_0} \mid d_{k_0,n_0} = a_q) = \sum_{(k,n) \in \Omega_{k_0,n_0}} \left\{ \frac{1}{[2\pi \mathrm{Var}(R\{\xi_{k_0,n_0}\})]^{1/2}} \times \exp\left[ -\frac{\left( \tilde{d}_{k_0,n_0} - E(R\{\xi_{k_0,n_0}\}) - \frac{\sum_{n_r=1}^{N_R} \sum_{n_t=1}^{N_T} |\phi_{k_0,n_0}^{(n_t,n_r)}|^2 a_q}{2\mathrm{Var}(R\{\xi_{k_0,n_0}\})} \right)^2}{} \right] \prod_{(k,n) \in \Omega_{k_0,n_0}} P(d_{k,n} = a_q) \right\}$$

wherein $$P(d_{k,n} = a_q) = \prod_{u=1,2,\ldots,Q; q_u \in +1,-1} P(b_{k,n}(u) = q_u), (k_0, n_0),$$

is a target time-frequency grid point, $(k,n)$ is a neighboring time-frequency grid point of the target time-frequency grid point, $\Xi(b_{k_0,n_0}(u))$ is the estimating log-likelihood ratio of the u-th bit $b_{k_0,n_0}(u)$ in a source signal $d_{k_0,n_0}$ at the target time-frequency grid point $(k_0,n_0)$, $\tilde{d}_{k_0,n_0}$ is an initialized signal at the target time-frequency grid point $(k_0,n_0)$, $a_q$ is a transmitted real symbol and $a_q = 2^Q - 2q+1$, $q=1, 2, \ldots, 2^Q$, Q is the order of a QAM modulator, a positive and negative binary sequence of $a_q$ is $1_2(a_q) = q_1 q_2 \ldots q_Q$, $q_u \in (+1,-1)$, $\forall_u \in 1, 2, \ldots Q$, $\phi_{k_0,n_0}^{(n_t,n_r)}$ is a channel equalization coefficient of a channel between a receive antenna $n_r$ and a transmit antenna $n_t$ at the time-frequency grid point $(k_0,n_0)$, $d_{k,n}$ is a source signal at the time-frequency grid point $(k,n)$, $b_{k,n}(u)$ is the u-th bit of the source signal $d_{k,n}$ at the time-frequency grid point $(k,n)$, $N_T$ ($N_T \geq 1$) is the number of transmit antennas, $N_R$ ($N_R \geq 1$) is the number of receive antennas, $\omega_{k_0,n_0}$ is a neighborhood of the target time-frequency grid point $(k_0,n_0)$;

$E(R\{\xi_{k_0,n_0}\})$ and $\mathrm{Var}(R\{\xi_{k_0,n_0}\})$ are respectively expressed as:

$$E(R\{\xi_{k_0,n_0}\}) = E\left( \sum_{n_r=1}^{N_R} \sum_{n_t=1}^{N_T} (\phi_{k_0,n_0}^{(n_t,n_r)})^{Re} (y_{k_0,n_0}^{n_r})^{Re} \right) + E\left( \sum_{n_r=1}^{N_R} \sum_{n_t=1}^{N_T} (\phi_{k_0,n_0}^{(n_t,n_r)})^{Im} (y_{k_0,n_0}^{n_r})^{Im} \right) - \varphi_{k_0,n_0} E(d_{k_0,n_0})$$

wherein, $$E\left( \sum_{n_r=1}^{N_R} \sum_{n_t=1}^{N_T} (\phi_{k_0,n_0}^{(n_t,n_r)})^{Re} (y_{k_0,n_0}^{n_r})^{Re} \right) = \left( \sum_{n_r=1}^{N_R} \sum_{n_t=1}^{N_T} ((\phi_{k_0,n_0}^{(n_t,n_r)})^{Re})^2 \right) E(d_{k_0,n_0}) - \sum_{(k,n) \in \Omega_{k_0,n_0}} E(d_{k,n}) \delta_{(k,n),(k_0,n_0)} \sum_{n_r=1}^{N_R} \sum_{n_t=1}^{N_T} ((\phi_{k_0,n_0}^{(n_t,n_r)})^{Re} (h_{k,n}^{(n_t,n_r)})^{Im}),$$

$$E\left( \sum_{n_r=1}^{N_R} \sum_{n_t=1}^{N_T} (\phi_{k_0,n_0}^{(n_t,n_r)})^{Im} (y_{k_0,n_0}^{n_r})^{Im} \right) = \left( \sum_{n_r=1}^{N_R} \sum_{n_t=1}^{N_T} ((\phi_{k_0,n_0}^{(n_t,n_r)})^{Im})^2 \right) E(d_{k_0,n_0}) - \sum_{(k,n) \in \Omega_{k_0,n_0}} E(d_{k,n}) \delta_{(k,n),(k_0,n_0)} \sum_{n_r=1}^{N_R} \sum_{n_t=1}^{N_T} ((\phi_{k_0,n_0}^{(n_t,n_r)})^{Im} (h_{k,n}^{(n_t,n_r)})^{Re})$$

and $$\mathrm{Var}(R\{\xi_{k_0,n_0}\}) = \mathrm{Var}\left( \sum_{n_r=1}^{N_R} \sum_{n_t=1}^{N_T} (\phi_{k_0,n_0}^{(n_t,n_r)})^{Re} (y_{k_0,n_0}^{n_r})^{Re} \right) + \mathrm{Var}\left( \sum_{n_r=1}^{N_R} \sum_{n_t=1}^{N_T} (\phi_{k_0,n_0}^{(n_t,n_r)})^{Im} (y_{k_0,n_0}^{n_r})^{Im} \right) + 2 \sum_{n_r=1}^{N_R} \sum_{n_t=1}^{N_T} (\phi_{k_0,n_0}^{(n_t,n_r)})^{Re} (\phi_{k_0,n_0}^{(n_t,n_r)})^{Im} \Psi_{(k,n),(k_0,n_0)}^{n_r} - \varphi_{k_0,n_0}^2 \mathrm{Var}(d_{k_0,n_0})$$

wherein, $\Psi_{(k,n)(k_0,n_0)}^{n_r}$ is the covariance of $(y_{k_0,n_0}^{n_r})^{Re}$ and $(y_{k_0,n_0}^{n_r})^{Im}$, and is calculated according to:

$$\Psi_{(k,n),(k_0,n_0)}^{n_r} = \sum_{n_t=1}^{N_T} \left( \left(h_{k_0,n_0}^{(n_t,n_r)}\right)^{Re} \left(h_{k_0,n_0}^{(n_t,n_r)}\right)^{Im} \right) \text{Var}(d_{k_0,n_0}) -$$

$$\sum_{(k,n)\in\Omega_{k_0,n_0}} \text{Var}(d_{k,n}) \delta_{(k,n),(k_0,n_0)}^2 \sum_{n_t=1}^{N_T} \left( \left(h_{k,n}^{(n_t,n_r)}\right)^{Re} \left(h_{k,n}^{(n_t,n_r)}\right)^{Im} \right)$$

and, $$\text{Var}\left( \sum_{n_r=1}^{N_R} \sum_{n_t=1}^{N_T} \left(\phi_{k_0,n_0}^{(n_t,n_r)}\right)^{Re} \left(y_{k_0,n_0}^{n_r}\right)^{Re} \right) =$$

$$\left( \sum_{n_r=1}^{N_R} \sum_{n_t=1}^{N_T} \left(\phi_{k_0,n_0}^{(n_t,n_r)}\right)^{Re} \left(h_{k_0,n_0}^{n_t,n_r}\right)^{Re} \right)^2 \text{Var}(d_{k_0,n_0}) -$$

$$\sum_{(k,n)\in\Omega_{k_0,n_0}} \text{Var}(d_{k,n}) \delta_{(k,n),(k_0,n_0)}^2 \left( \sum_{n_r=1}^{N_R} \sum_{n_t=1}^{N_T} \left(\left(\phi_{k_0,n_0}^{(n_t,n_r)}\right)^{Re} \left(h_{k,n}^{(n_t,n_r)}\right)^{Im}\right) \right)^2,$$

$$\text{Var}\left( \sum_{n_r=1}^{N_R} \sum_{n_t=1}^{N_T} \left(\phi_{k_0,n_0}^{(n_t,n_r)}\right)^{Im} \left(y_{k_0,n_0}^{n_r}\right)^{Im} \right) =$$

$$\left( \sum_{n_r=1}^{N_R} \sum_{n_t=1}^{N_T} \left(\phi_{k_0,n_0}^{(n_t,n_r)}\right)^{Im} \left(h_{k_0,n_0}^{n_t,n_r}\right)^{Im} \right)^2 \text{Var}(d_{k_0,n_0}) -$$

$$\sum_{(k,n)\in\Omega_{k_0,n_0}} \text{Var}(d_{k,n}) \delta_{(k,n),(k_0,n_0)}^2 \left( \sum_{n_r=1}^{N_R} \sum_{n_t=1}^{N_T} \left(\left(\phi_{k_0,n_0}^{(n_t,n_r)}\right)^{Im} \left(h_{k,n}^{(n_t,n_r)}\right)^{Re}\right) \right)^2$$

wherein, $h_{k_0,n_0}^{(n_t,n_r)}$ is a frequency response of a channel between a receive antenna $n_r$ and a transmit antenna $n_t$ at the time-frequency grid point $(k_0,n_0)$, $h_{k,n}^{(n_t,n_r)}$ is a frequency response of the channel between the receive antenna $n_r$ and the transmit antenna $n_t$ at the time-frequency grid point $(k,n)$, $R\{\cdot\}$ denotes taking a real part, $(\cdot)^{Re}$ and $(\cdot)^{Im}$ respectively denote a real part and an imaginary part of a complex symbol, $\delta_{(k,n)(k_0,n_0)}$ is an amplitude of $$\sum_{m=-\infty}^{\infty} g_{k,n}[m] f_{k_0,n_0}[m],$$

$g_{k,n}[m]$ is a filtering function of a synthesis filter at the time-frequency grid point $(k,n)$, $f_{k_0,n_0}[m]$ is a filtering function of an analysis filter at the time-frequency grid point $(k_0,n_0)$, m is a sampling index of a filter, $y_{k_0,n_0}^{n_r}$ is a filtered signal of the receive antenna at the target time-frequency grid point $(k_0,n_0)$, $$\varphi_{k_0,n_0} = \sum_{n_r=1}^{N_R} \sum_{n_t=1}^{N_T} \left(\phi_{k_0,n_0}^{(n_t,n_r)}\right)^* h_{k_0,n_0}^{(n_t,n_r)}.$$

In an example, the step 3 may include:
applying a posteriori probability (APP) decoding to the received signal using the estimating log-likelihood ratio of the received signal to obtain a posteriori log-likelihood ratio of the received signal; and
calculating the decoding log-likelihood ratio of the received signal using the estimating log-likelihood ratio and the posteriori log-likelihood ratio of the received signal.
In an example, the APP decoding comprises a (Bahl-Cocke-Jelinek-Raviv) BCJR decoding algorithm.

In an example, before a first iterative procedure is performed, calculating the statistics information of the received signal using the received signal after the interference post-processing and/or the received signal after the interference pre-processing.

An apparatus for interference cancellation, comprising: a first module, a second module, a third module and an iteration module, wherein the first module is configured for calculating a mean value and a variance value of a received signal to obtain statistics information of the received signal;
the second module is configured for calculating an estimating log-likelihood ratio of the received signal using the statistics information;
the third module is configured for calculating a decoding log-likelihood ratio of the received signal using the estimating log-likelihood ratio of the received signal, and updating calculations of the statistics information of the received signal;
the iteration module is configured for making the first module, the second module and the third module repeat the operations for a pre-determined number of times, and outputting data bits obtained from hard decisions.

An auxiliary method for interference cancellation according to various examples may include:
obtaining, by a base station, channel state information reported by user equipments (UE);
selecting, by the base station, a UE for which uplink iterative interference cancellation is to be performed according to the channel state information, instructing the selected UE via a downlink control channel to report information of a configurable transmission mode and a configurable parameter of a synthesis filter bank;
configuring, by the base station, transmission mode parameter and a synthesis filter bank parameter for the UE according to the information of the configurable transmission mode and the configurable parameter of the synthesis filter bank reported by the UE and antenna configuration information and resources allocation information of the base station, and transmitting the configured parameter to the UE via a downlink control channel;
receiving, by the base station, an uplink FBMC/OQAM signal from the UE; and
performing, by the base station, interference cancellation according to the method of claim 1 on the received FBMC/OQAM signal.

In an example, the channel state information comprises one or multiple of: a channel quality indicator (CQI), a precoding matrix indicator (PMI) and a rank indicator (RI);
the information of the transmission mode comprises: the number of transmit antennas, information of a MIMO transmission mode; and
the information of the parameter of the synthesis filter bank comprises: information on the type and category of the synthesis filter bank, and information on the configured parameter of the synthesis filter bank.

In an example, the information of the configurable transmission mode and information of the configurable parameter of the synthesis filter bank reported by the UE are obtained by the base station by looking up a table; the parameter of the transmission mode and the parameter of the synthesis filter bank transmitted by the base station are obtained by the UE by looking up a table.

An auxiliary method for interference cancellation according to various examples may include:
selecting and configuring, by a UE, a transmission mode and a parameter of a synthesis filter bank;

transmitting, by the UE, an uplink FBMC/OQAM signal using the selected transmission mode and the parameter of the synthesis filter bank;

reporting, by the UE, channel state information and information of the selected transmission mode and the parameter of the synthesis filter bank to a base station;

selecting, by the base station, a UE for which uplink iterative interference cancellation is to be performed according to channel state information reported by the UE and antenna configuration information and resources allocation information of the base station;

selecting, by the base station, a parameter for a synthesis filter bank and an iterative algorithm according to information of a transmission mode and a parameter of a synthesis filter bank reported by the UE, and applying the method of claim 1 to the FBMC/OQAM signal received.

In an example, the channel state information comprises one or multiple of: a channel quality indicator (CQI), a precoding matrix indicator (PMI) and a rank indicator (RI); the information of the transmission mode comprises: the number of transmitting antennas, information of a MIMO transmission mode; and the information of the parameter of the synthesis filter bank comprises: information on the type and category of the synthesis filter bank, and information on the configured parameter of the synthesis filter bank.

A base station provided by various examples may include a reception module, a configuration module, and a communication module, the reception module is configured for processing a received signal through initialization, channel estimation and interference cancellation, and for receiving measurement information and configuration information transmitted by a user equipment (UE); the configuration module is configured for configuring a function mode of a base band unit, configuring a transmission parameter of the UE according to the measurement information and the configuration information reported by the UE, configuring a parameter of a filter selected in the base station and a parameter of an iterative interference cancellation process; and the communication module is configured for communicating with the UE, and communicating with another base station via a standard interface.

A user equipment (UE) provided by various examples may include a reception module, a configuration module, a report module and a communication module, the reception module is configured for receiving configuration information transmitted by a base station which includes, but not limited to, configuration information of a transmission mode and a parameter of a synthesis filter; the configuration module is configured for configuring a transmission parameter of the UE which includes, but is not limited to, a parameter of the transmission mode and a parameter of the synthesis filter; the report module is configured for reporting channel state information, information of a configurable transmission mode and a configurable parameter of the synthesis filter, a currently-used transmission mode and a currently-used parameter of the synthesis filter; and the communication module is configured for communicating with the base station.

Various examples of the present disclosure provide an effective mechanism with low complexity for eliminating or avoiding residual ISI and ICI in an FBMC/OQAM system in multi-path fading channels. Various examples provide a method and an apparatus for interference cancellation to reduce the impact of residual inherent interference on system performance and to improve spectral efficiency and design flexibility of an FBMC/OQAM system. Various examples also provide an auxiliary method for canceling the interference between base stations and user equipment's (UE) and the interference between base stations, to assist the implementation of the method and a receiver for interference cancellation.

BRIEF DESCRIPTION OF THE DRAWINGS

FIG. 14 is a schematic diagram illustrating pulse responses of a multiplexer using a PHYDYAS prototype filter in an FBMC/OQAM system;

DETAILED DESCRIPTION

The present invention is hereinafter further described in detail with reference to the accompanying drawings as well as embodiments so as to make the objective, technical solution and merits thereof more apparent.

Figure 1:
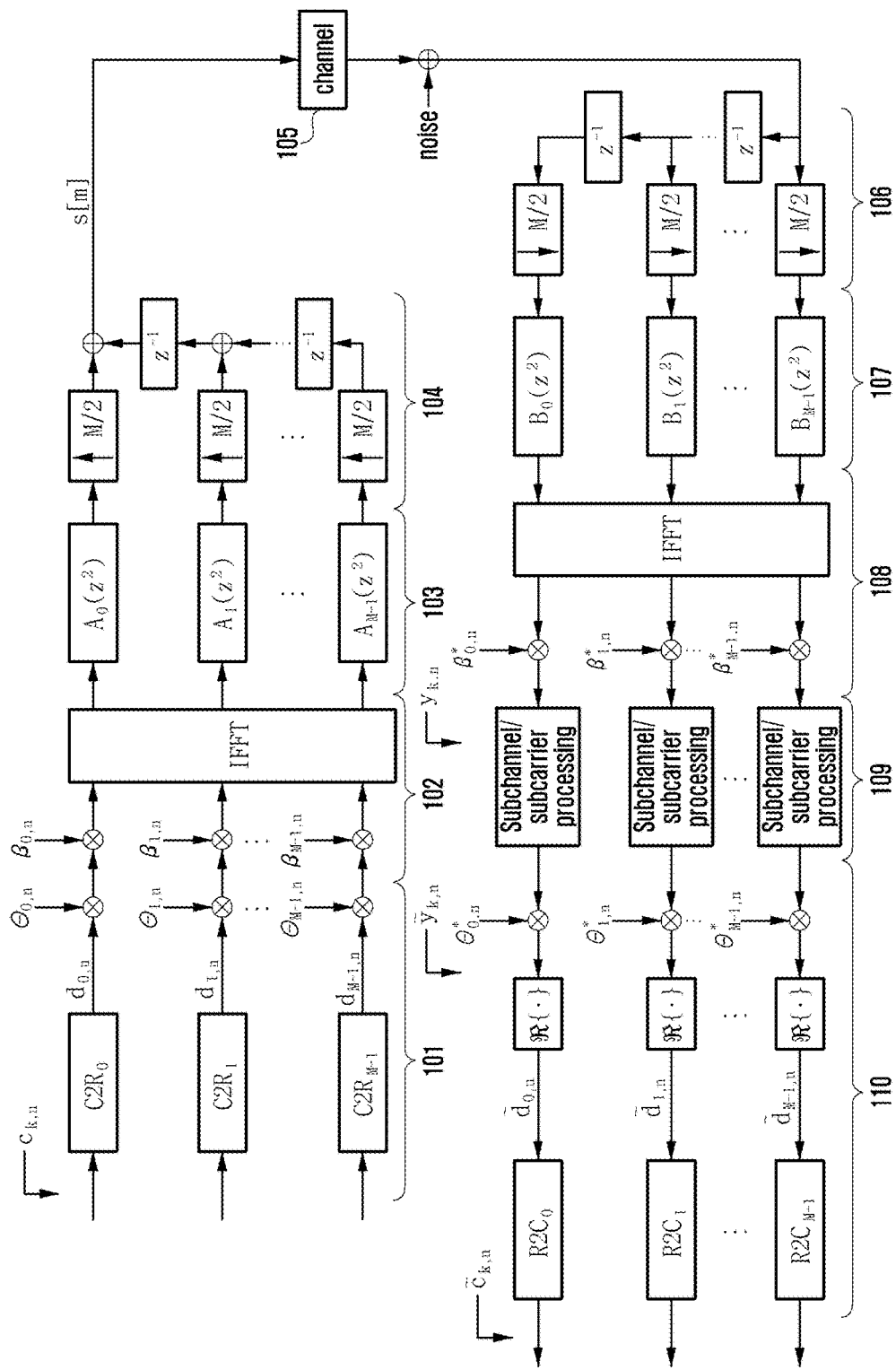
FIG. 1 is a schematic diagram illustrating the principle of a transmitter and a receiver based on filter banks in an FBMC/OQAM system.

FIG. 1 is a schematic diagram illustrating the principle of a transmitter and a receiver in an FBMC/OQAM system. As shown in FIG. 1, at the transmitter side, 101 is an OQAM modulation module, 102 is an IFFT module, 103 is a Polyphase filter module, 104 is a parallel to serial conversion module. In an example, modules 102, 103 and 104 are collectively referred to as a synthesis filter bank (SFB). Referring to FIG. 1, an FBMC/OQAM discrete-time baseband signal that satisfies the causal condition can be expressed as:

$$s[m] = \sum_{k=0}^{M-1} \sum_{n=-\infty}^{\infty} d_{k,n} \theta_{k,n} p\left[m - \frac{nM}{2}\right] e^{j(2\pi/M)k(m-n(M/2)-((L_p-1)/2))} \quad (1)$$

In the formula, $$\theta_{k,n} = e^{j(\pi/2)(k+n)} = j^{k+n} = \begin{cases} 1, & m+k \text{ is an even number} \\ j, & m+k \text{ is an odd number} \end{cases} \quad (2)$$

p[m] denotes a prototype filter bank with length $L_p$, m is the sampling time index of the SFB. M denotes the number of sub-carriers in the filter bank, and is generally an even number. The length $L_p$ of p[m] is determined by the number of sub-carriers in the filter bank and an integral overlapping factor K, i.e., $L_p$=KM. The overlapping factor K denotes the number of transmitted FBMC/OQAM symbols that are overlapped in the time domain. $d_{k,n}$ denotes a base band modulated real symbol transmitted on the k-th sub-carrier within the n-th (n∈Z) symbol, having a transmission data rate of 2/T. T denotes the length of a symbol, T=1/Δf, Δf is the sub-carrier interval. In addition, $d_{k,n}$ and $d_{k,n+1}$ respectively denote an In-phase (I) component and a Qua-drature (Q) component of a complex symbol, and each has a transmission rate of 1/T. In 101, the "$C2R_k$" module denotes applying a taking real part operation and a taking imaginary part operation respectively to the I component and the Q component of an input complex symbol $C_{k,n}$ at the transmitter side, and the up-sampling rate is 2. $C_{k,n}$ is an QAM modulated symbol, and transmission of its real part and transmission of its imaginary part are overlapped in the time domain and have an offset of half a symbol duration T/2, and this is the origin of the name of offset QAM. In an example, operations performed by the "$C2R_k$" module in 101 may be expressed by the following formula:

$$d_{k,2n} = \begin{cases} \Re\{c_{k,n}\}, & k \text{ is an even number} \\ \Im\{c_{k,n}\}, & k \text{ is an odd number} \end{cases} \quad (3)$$

$$d_{k,2n+1} = \begin{cases} \Im\{c_{k,n}\}, & k \text{ is an even number} \\ \Re\{c_{k,n}\}, & k \text{ is an odd number} \end{cases} \quad (4)$$

In the above formulas, $\Re\{\bullet\}$ and $\Im\{\bullet\}$ respectively denote the operation of taking a real part and the operation of taking an imaginary part. According to formula (1), the base function of SFB can be expressed as a function of the prototype filter bank P[m].

$$\tilde{g}_k[m] = p[m] e^{j(2\pi/M)k(m-((L_p-1)/2))} \quad (5)$$

In an example, taking a phase factor $\theta_{k,n}$ into consideration, formula (1) can be simplified as:

$$s[m] = \sum_{k=0}^{M-1} \sum_{n=-\infty}^{\infty} d_{k,n} g_{k,n}[m] \quad (6)$$

In the formula, $$g_{k,n}[m] = \theta_{k,n} \tilde{g}_k\left[m - \frac{nM}{2}\right] = \theta_{k,n} p\left[m - \frac{nM}{2}\right] e^{j(2\pi/M)k(m-n(M/2)-((L_p-1)/2))} \quad (7)$$

is the offset of p[m] in the time domain.

In an example, the FBMC/OQAM system can also be implemented using IFFT/FFT. In an example, the formula (1) can be re-formulated as:

$$s[m] = \sum_{k=0}^{M-1} \sum_{n=-\infty}^{\infty} d_{k,n} \theta_{k,n} \beta_{k,n} p\left[m - \frac{nM}{2}\right] e^{j(2\pi/M)km} \quad (8)$$

In the formula, $$\beta_{k,n} = (-1)^{kn} e^{-j(2\pi k/M)((L_p-1)/2)} \quad (9)$$

Formula (8) can be re-formulated as:

$$s[m] = \sum_{k=0}^{M-1} \sum_{n=-\infty}^{\infty} d_{k,n} \theta_{k,n} \beta_{k,n} p\left[m - \frac{nM}{2}\right] e^{j(2\pi/M)km} \quad (10)$$

$$= \sum_{n=-\infty}^{\infty} \sum_{k=0}^{M-1} v_{k,n} e^{j(2\pi/M)km} p\left[m - \frac{nM}{2}\right]$$

$$= \sum_{n=-\infty}^{\infty} F_n p\left[m - \frac{nM}{2}\right].$$

Obviously, $F_n$ is the IFFT counterpart of $v_{k,n}$ ($v_{k,n}=d_{k,n}\theta_{k,n}\beta_{k,n}$). It can be seen from formulae (8)-(10), a complex signal of the FBMC/OQAM system is analyzed into a real part and an imaginary part after real/imaginary separation, then M-point IFFT is applied to the real part and the imaginary part respectively.

As shown in FIG. 1, at the receiver side, 106 is a serial to parallel conversion module, 107 is a Polyphase filter module corresponding to 103, 108 is an FFT module, 109 is a sub-channel/sub-carrier processing module, and 110 is an OQAM demodulation module corresponding to 101. The "R2C$_k$" module in 110 performs an operation which is the inverse operation to the operation performed by the "C2R$_k$" module in 101. In an example, modules 106, 107 and 108 are collectively referred to as an analysis filter bank (AFB), and is corresponding to the SFB at the transmitter side. The base function of the AFB is expressed as:

$$\tilde{f}_k[m] = \tilde{g}^*_k[L_p - 1 - m] \quad (11)$$

In the formula, m=0, 1, . . . , $L_p$–1, (•)* denotes a complex conjugate operation. In addition, $f_{k,n}[m]$ denotes a filtering function of a matched filter corresponding to $g_{k,n}[m]$, and is expressed as:

$$f_{k,n}[m] = g^*_{k,n}[m] \quad (12)$$

Disregarding impacts of channel fading and noise, the output of a matched filter for the $k_0$-th sub-carrier in the $n_0$-th symbol at the receiver side according to formula (6) is:

$$\hat{y}_{k_0,n_0} = \sum_{m=-\infty}^{\infty} \sum_{k=0}^{M-1} \sum_{n=-\infty}^{\infty} d_{k,n} g_{k,n}[m] f_{k_0,n_0}[m] \quad (13)$$

According to formula (13), design of the prototype filter bank p[m] is required to satisfy the perfect reconstruction (PR) of a transmitted signal at the receiver side when impacts of channel fading and noise are not taken into consideration. In an example, the PR condition can be satisfied as long as the real parts satisfy the orthogonality condition to make the FBMC/OQAM system an orthogonal system. Therefore, the design of the prototype filter bank p[m] needs to satisfy:

$$\Re\{\langle g_{k,n}, f_{k',n'}\rangle\} = \Re\left\{\sum_{m=-\infty}^{\infty} g_{k,n}[m] f_{k',n'}[m]\right\} = \delta_{k,k'} \delta_{n,n'} \quad (14)$$

<x,y> denotes an inner product operation. If k=k', $\delta_{k,k'}=1$, and if k≠k', $\delta_{k,k'}=0$. That is, if (k,n)≠(k',n'), <$g_{k,n},f_{k',n'}$> is an imaginary value. Disregarding impacts of channel fading and noise, according to formula (14), formula (13) can be re-formulated as:

$$\hat{y}_{k_0,n_0} = d_{k_0,n_0} + \underbrace{\sum_{(k,n)\neq(k_0,n_0)} d_{k,n} \sum_{m=-\infty}^{\infty} g_{k,n}[m] f_{k_0,n_0}[m]}_{I_{k_0,n_0}: \text{ inherent interference}} \quad (15)$$

According to formula (14), inherent interference $I_{k0,n0}$ is an imaginary number. Thus, formula (15) can be further simplified as:

$$\hat{y}_{k_0,n_0} = d_{k_0,n_0} + ju_{k_0,n_0} \quad (16)$$

In the formula, $u_{k_0,n_0}$ is a real number. Obviously, the signal $d_{k_0,n_0}$ transmitted on the $k_0$-th sub-carrier in the $n_0$-th symbol can be accurately recovered by simply taking the real part of the received signal $\hat{y}_{k0,n0}$, i.e., $$\tilde{d}_{k_0,n_0} = \Re\{\hat{y}_{k_0,n_0}\} = d_{k_0,n_0} \quad (17)$$

The mechanism of the present disclosure is hereinafter described in detail with reference to several embodiments.

Embodiment One

When impacts of channel fading 105 and noise are taken into consideration, an output signal $y_{k0,n0}$ of a matched filter for a signal received on the $k_0$-th sub-carrier in the $n_0$-th symbol at the receiver side is expressed as:

$$y_{k_0,n_0} = \quad (18)$$

$$h_{k_0,n_0} d_{k_0,n_0} + \sum_{(k,n)\neq(k_0,n_0)} d_{k,n} h_{k,n} \sum_{m=-\infty}^{\infty} g_{k,n}[m] f_{k_0,n_0}[m] + v_{k_0,n_0}$$

In the formula, $h_{k,n}$ denotes the frequency response of a multi-path fading channel coefficient at a time-frequency point (k,n), $V_{k0,n0}$ denotes a noise component at a time-frequency point ($k_0$,$n_0$). Assuming the receiver can obtain an accurate channel impulse response coefficient by using an effective channel estimation method for FBMC/OQAM systems, a signal obtained by processing $y_{k0,n0}$ through Minimum Mean Squared Error (MMSE)-based sub-channel/sub-carrier equalization module 109 can be expressed as:

$$\tilde{y}_{k_0,n_0} = \phi^*_{k_0,n_0} y_{k_0,n_0} \quad (19)$$

$$= \phi^*_{k_0,n_0} h_{k_0,n_0} d_{k_0,n_0} +$$

$$\underbrace{\sum_{(k,n)\neq(k_0,n_0)} d_{k,n} \phi^*_{k_0,n_0} h_{k,n} \sum_{m=-\infty}^{\infty} g_{k,n}[m] f_{k_0,n_0}[m] + \tau_{k_0,n_0}}_{\tilde{i}_{k_0,n_0}}$$

wherein, $\tau_{k0,n0} = \Phi^*_{k0,n0} v_{k0,n0} \cdot \Phi_{k0,n0}$ is the coefficient of the MMSE-based equalizer adopted by the receive at the time-frequency grid point ($k_0$,$n_0$), and can be expressed as:

$$\phi_{k_0,n_0} = h_{k_0,n_0}/(|h_{k_0,n_0}|^2 + \sigma_0^2) \quad (20)$$

In the formula, $\sigma_0^2$ the variance of the noise component $v_{k0,n0} \cdot \tilde{I}_{k0,n0}$ is a complex-valued component, denoting the interference between a real symbol and an adjacent imaginary symbol. The interference makes it difficult for the receiver to accurately recover the original transmitted symbols by simply performing taking real part operations. Therefore, it is especially important to design a simple and effective interference cancellation mechanism to eliminate ISI/ICI resulted from multi-path channels in an FBMC/OQAM system. In addition, the method of sub-channels/sub-carriers processing is not limited in the present disclosure, and can be a sub-channel/sub-carrier equalization method based on a certain criterion, e.g., the MMSE criterion, the ZF criterion, the maximum ratio combining (MRC) criterion, or the like.

It can be seen from formula (19), when there are a large number of sub-carriers, i.e., the total interference $\tilde{I}_{k0,n0}$ includes a large number of interference components, the total interference $\tilde{I}_{k0,n0}$ still satisfies the central limit theorem according to the Lyapunov theorem, i.e., the distribution of the total interference obeys a Gaussian distribution, even if the interference components have different distributions due to their different ambiguity functions. Based on the above property, the present disclosure provides a method of designing a low complexity receiver which eliminates residual ISI and ICI after channel equalization in the FBMC/OQAM system.

According to the above method, the formula (19) can be re-formulated as:

$$\tilde{y}_{k_0,n_0} = \rho_{k_0,n_0} d_{k_0,n_0} + \xi_{k_0,n_0} \quad (21)$$

$\rho_{k_0,n_0} = |h_{k_0,n_0}|^2/(|h_{k_0,n_0}|^2 + \sigma_0^2)$, $\xi_{k_0,n_0} = \tilde{I}_{k_0,n_0} + \tau_{k_0,n_0}$ is a Gaussian random variable having a mean value of $E(\xi_{k0,no})$ and a variance of $Var(\xi_{k0,no})$.

Figure 2:
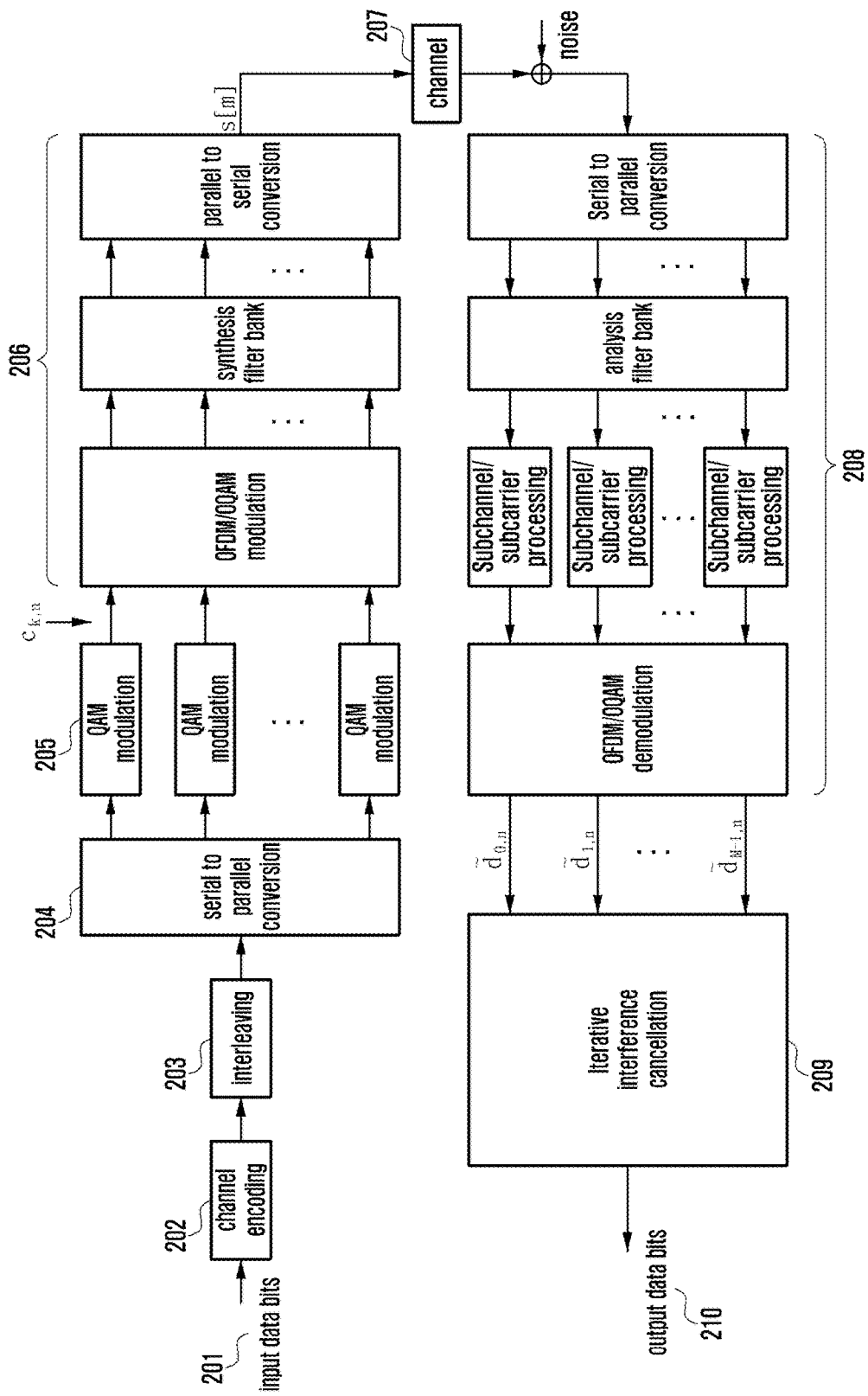
FIG. 2 is a schematic diagram illustrating the principle of a transmitter and a receiver in an FBMC/OQAM system using an iterative interference cancellation receiver in accordance with embodiment one of the present disclosure.

FIG. 2 is a schematic diagram illustrating the principle of a transmitter and a receiver in an FBMC/OQAM system using an iterative interference cancellation receiver in accordance with embodiment one of the present disclosure. As shown in FIG. 2, an input bits flow (+1, −1) 201 is processed by a channel encoding module 202, an interleaving module 203 and a serial to parallel conversion module 204, and then QAM modulation to generate QAM symbols $\{c_{k,n}\}$, $k \in [0, M−1]$, $n \in (−\infty, +\infty)$. Module 206 processes $\{c_{k,n}\}$ and generates a transmitting signal $\{s[m]\}$, $m \in (−\infty, +\infty)$. Operations performed by module 206 are equivalent to operations performed by modules 101, 102, 103 and 104 in FIG. 1. The transmitting signal $\{s[m]\}$ is propagated through the wireless fading channel 207, and then processed by module 208 which outputs real symbols $\{\tilde{d}_{k,n}\}$, $k \in [0, M−1]$, $n \in (−\infty, +\infty)$. Operations performed by module 208 are equivalent to operations performed by modules 106, 107, 108, 109 and 110 in FIG. 1. It should be noted that in embodiment one, module 208 does not perform the operation of the "R2 $C_k$" module in module 110. The iterative interference cancellation module 209 of the present disclosure processes the real symbols $\{\tilde{d}_{k,n}\}$ and outputs a bits stream (+1, −1) 210.

Figure 3:
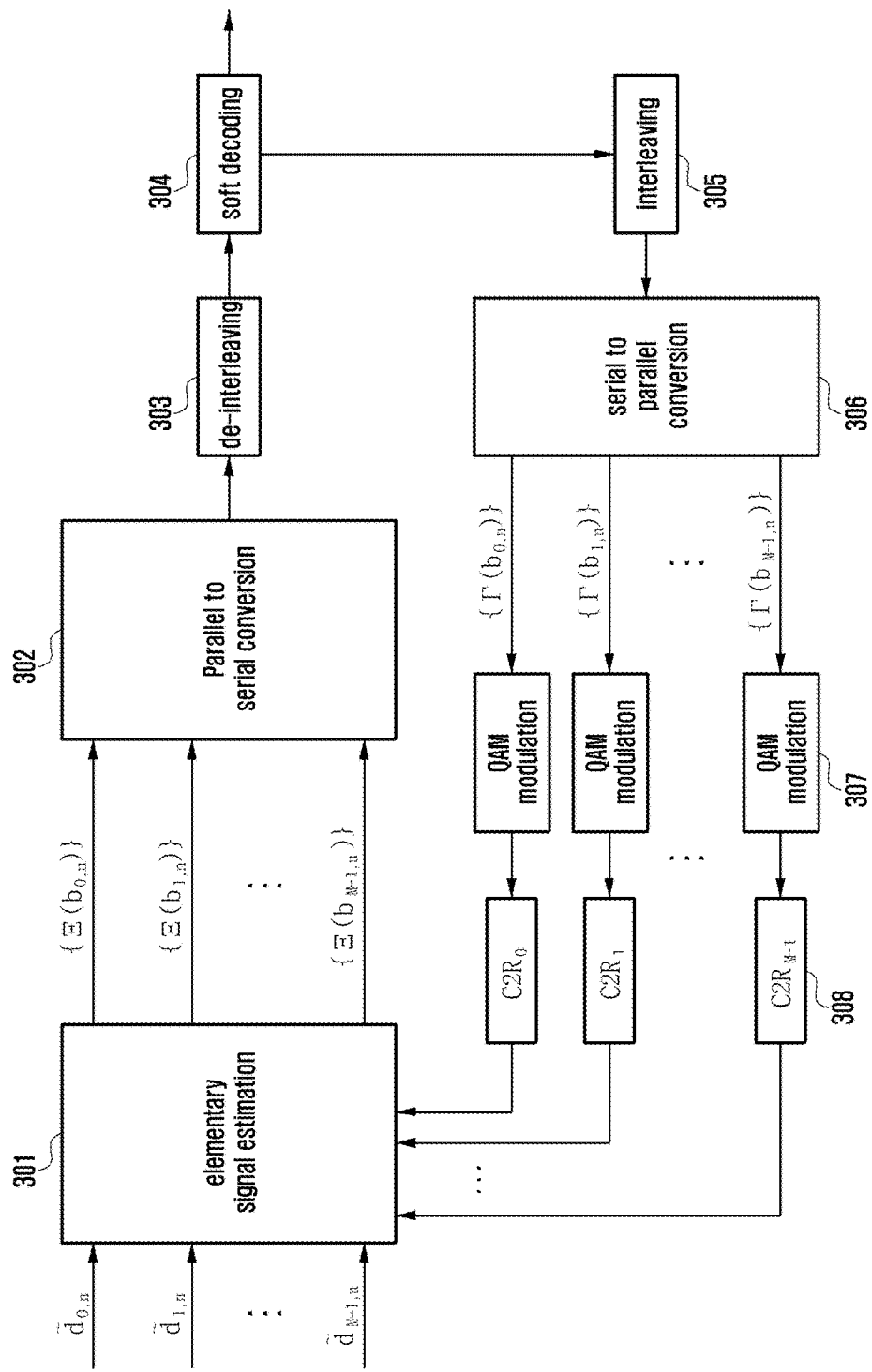
FIG. 3 is a schematic diagram illustrating design principles of an iterative interference cancellation receiver in accordance with embodiment one of the present disclosure.

FIG. 3 is a schematic diagram illustrating design principles of an iterative interference cancellation receiver in accordance with embodiment one of the present disclosure. As shown in FIG. 3, the real symbols $\{\tilde{d}_{k,n}\}$ are first processed by an elementary signal estimator 301 which outputs an estimating log-likelihood ratio. $\{b_{k,n}\}$ denotes binary data bits contained in the real symbols $d_{k,n}$. The estimating log-likelihood ratio is processed by the parallel to serial conversion module 302 and the de-interleaving module 303, and then inputted into a soft decoder 304. Before performing hard decisions on the input data, the soft decoder 304 calculates the decoding log-likelihood ratios $\{T(b_{k,n})\}$ of the input data. The decoding log-likelihood ratios are processed by an interleaving module 305 and a serial to parallel conversion module 306, and then processed by a QAM modulation module 307 and a taking real/imaginary part module 308. Then the processed data is inputted into the elementary signal estimator 301 to update a parameter.

The operation procedures of the elementary signal estimator 301 are described in the following.

It can be obtained from formulae (18)-(20) that:

$$\tilde{d}_{k_0,n_0} = \Re\{\tilde{y}_{k_0,n_0}\} = \Re\{\phi^*_{k_0,n_0} y_{k_0,n_0}\} = \phi_{k_0,n_0}^{Re} y_{k_0,n_0}^{Re} + \phi_{k_0,n_0}^{Im} y_{k_0,n_0}^{Im} \quad (22)$$

In the formula, $(\cdot)^{Re}$ and $(\cdot)^{Im}$ respectively denote the real part and the imaginary part of a complex symbol. The mean value of $\Re\{\xi_{k0,n0}\}$ according to formula (21) is calculated as:

$$E(\Re\{\xi_{k_0,n_0}\}) = \phi_{k_0,n_0}^{Re} E(y_{k_0,n_0}^{Re}) + \phi_{k_0,n_0}^{Im} E(y_{k_0,n_0}^{Im}) - \rho_{k_0,n_0} E(d_{k_0,n_0}) \quad (23)$$

In the formula, $$E(y_{k_0,n_0}^{Re}) = h_{k_0,n_0}^{Re} E(d_{k_0,n_0}) - \sum_{(k,n) \neq (k_0,n_0)} h_{k,n}^{Im} E(d_{k,n}) \delta_{(k,n),(k_0,n_0)} \quad (24)$$

$$E(y_{k_0,n_0}^{Im}) = h_{k_0,n_0}^{Im} E(d_{k_0,n_0}) + \sum_{(k,n) \neq (k_0,n_0)} h_{k,n}^{Re} E(d_{k,n}) \delta_{(k,n),(k_0,n_0)} \quad (25)$$

$\delta_{(k,n),(k0,n0)}$ is the amplitude of $$\sum_{m=-\infty}^{\infty} g_{k,n}[m] f_{k_0,n_0}[m].$$

The variance of $\Re\{\xi_{k0,no}\}$ according to formula (23) is:

$$Var(\Re\{\xi_{k_0,n_0}\}) = (\phi_{k_0,n_0}^{Re})^2 Var(y_{k_0,n_0}^{Re}) + (\phi_{k_0,n_0}^{Im})^2 Var(y_{k_0,n_0}^{Im}) + 2\phi_{k_0,n_0}^{Re} \phi_{k_0,n_0}^{Im} \Psi_{(k,n),(k_0,n_0)} - \rho_{k_0,n_0}^2 Var(d_{k_0,n_0}) \quad (26)$$

In the formula, $\Psi_{(k,n),(k0,no)}$ is the covariance of $y_{k0,no}^{Re}$ and $y_{k0,no}^{Im}$, and is calculated according to:

$$\Psi_{(k,n),(k_0,n_0)} = \quad (27)$$
$$h_{k_0,n_0}^{Re} h_{k_0,n_0}^{Im} Var(d_{k_0,n_0}) - \sum_{(k,n) \neq (k_0,n_0)} h_{k,n}^{Re} h_{k,n}^{Im} Var(d_{k,n}) \delta^2_{(k,n),(k_0,n_0)}$$

In addition, $Var(y_{k0,no}^{Re})$ and $Var(y_{k0,no}^{Im})$ in formula (26) can be expressed as:

$$Var(y_{k_0,n_0}^{Re}) = \quad (28)$$
$$(h_{k_0,n_0}^{Re})^2 Var(d_{k_0,n_0}) - \sum_{(k,n) \neq (k_0,n_0)} (h_{k,n}^{Im})^2 Var(d_{k,n}) \delta^2_{(k,n),(k_0,n_0)}$$

$$Var(y_{k_0,n_0}^{Im}) = \quad (29)$$
$$(h_{k_0,n_0}^{Im})^2 Var(d_{k_0,n_0}) - \sum_{(k,n) \neq (k_0,n_0)} (h_{k,n}^{Re})^2 Var(d_{k,n}) \delta^2_{(k,n),(k_0,n_0)}$$

Thus, the probability density function of $\tilde{d}_{k0,n0}$ can be expressed as:

$$P(\tilde{d}_{k_0,n_0} | d_{k_0,n_0} = a_q) = \sum_{(k,n) \neq (k_0,n_0)} \left\{ \frac{1}{[2\pi Var(\Re\{\xi_{k_0,n_0}\})]^{1/2}} \times \exp\left[\frac{-(\tilde{d}_{k_0,n_0} - E(\Re\{\xi_{k_0,n_0}\})) - |\phi_{k_0,n_0}|^2 a_q)^2}{2Var(\Re\{\xi_{k_0,n_0}\})}\right] \right\} \quad (30)$$

-continued $$\left.\prod_{(k,n)\neq(k_0,n_0)} P(d_{k,n}=a_q)\right\}$$

In the formula, $a_q$ denotes a transmitted real symbol, and $a_q=2^Q-2q+1$, $q=1, 2, \ldots, 2^Q$. $Q$ is the QAM modulation order, i.e., $2^{2Q}$-QAM modulation is adopted. Further, assuming the positive and negative binary sequences of $a_q$ can be expressed as $l_2(a_2)=q_1 q_2 \ldots q_Q$, $q_u \in \{+1,-1\}$, $\forall u \in 1, 2, \ldots Q$. Then, $$P(d_{k,n}=a_q) = \prod_{u=1,2,\ldots,Q,q_u\in\{+1,-1\}} P(b_{k,n}(u)=q_u) \quad (31)$$

In addition, $$P(\tilde{d}_{k_0,n_0} | b_{k_0,n_0}(u)=+1) = \sum_{\{q_u=+1|u\in 1,2,\ldots,2^Q\}} P(\tilde{d}_{k_0,n_0} | d_{k_0,n_0}=a_q) \quad (32)$$

$$P(\tilde{d}_{k_0,n_0} | b_{k_0,n_0}(u)=-1) = \sum_{\{q_u=-1|u\in 1,2,\ldots,2^Q\}} P(\tilde{d}_{k_0,n_0} | d_{k_0,n_0}=a_q) \quad (33)$$

Therefore, the estimating log-likelihood ratio of the u-th bit of the real symbol $d_{k0,n0}$ outputted by the elementary signal estimator 301 can be calculated according to:

$$\Xi(b_{k_0,n_0}(u)) = \log\left[\frac{P(\tilde{d}_{k_0,n_0} | b_{k_0,n_0}(u)=+1)}{P(\tilde{d}_{k_0,n_0} | b_{k_0,n_0}(u)=-1)}\right] \quad (34)$$

The estimating log-likelihood ratio $\{\Xi(b_{k,n})\}$ is processed by the parallel to serial conversion module 302 and the de-interleaving module 303, and then inputted into the soft decoder 304. The soft decoder 304 calculates the decoding log-likelihood ratios $\{\Gamma(b_{k,n})\}$ of input data before performing hard decisions on the input data. The following is a method of calculating the decoding log-likelihood ratios $\{\Gamma(b_{k,n})\}$ First, the soft decoder 304 decodes inputted $\{\Xi(b_{k,n})\}$ using a A Posteriori Probability (APP) decoding algorithm to obtain the a posterior log-likelihood ratio $L_{App}(\Xi(b_{k0,n0}(u)))$ of the u-th bit of the real symbol $d_{k0,n0}$. The APP decoding algorithm may be the Bahl-Cocke-Jelinek-Raviv (BCJR) algorithm. In addition, according to the Bayesian theory, $L_{App}(\Xi(b_{k0,n0}(u)))$ can also be expressed as:

$$L_{APP}(\Xi(b_{k_0,n_0}(u))) = \log\left[\frac{P(b_{k_0,n_0}(u)=+1|\tilde{d}_{k_0,n_0})}{P(b_{k_0,n_0}(u)=-1|\tilde{d}_{k_0,n_0})}\right] \quad (35)$$

$$= \log\left[\frac{P(\tilde{d}_{k_0,n_0} | b_{k_0,n_0}(u)=+1)}{P(\tilde{d}_{k_0,n_0} | b_{k_0,n_0}(u)=-1)}\right] +$$

$$\log\left[\frac{P(b_{k_0,n_0}(u)=+1)}{P(b_{k_0,n_0}(u)=-1)}\right]$$

The decoding log-likelihood ratios outputted by the soft decoder 304 can be calculated according to:

$$\Gamma(b_{k_0,n_0}(u)) = \log\left[\frac{P(b_{k_0,n_0}(u)=+1)}{P(b_{k_0,n_0}(u)=-1)}\right] \quad (36)$$

$$= L_{APP}(\Xi(b_{k_0,n_0}(u))) -$$

$$\log\left[\frac{P(\tilde{d}_{k_0,n_0} | b_{k_0,n_0}(u)=+1)}{P(\tilde{d}_{k_0,n_0} | b_{k_0,n_0}(u)=-1)}\right]$$

$$= L_{APP}(\Xi(b_{k_0,n_0}(u))) - \Xi(b_{k_0,n_0}(u))$$

Then, the soft decoder 304 makes a decision on the $\Gamma(b_{k0,n0}(u))$. The result of the decision is processed by the interleaving module 305, the serial to parallel conversion module 306, the QAM modulation module 307 and the taking real/imaginary part module 308, and then is inputted into the elementary signal estimator 301 to calculate and update $E(d_{k,n})$ and $Var(d_{k,n})$.

Figure 4:
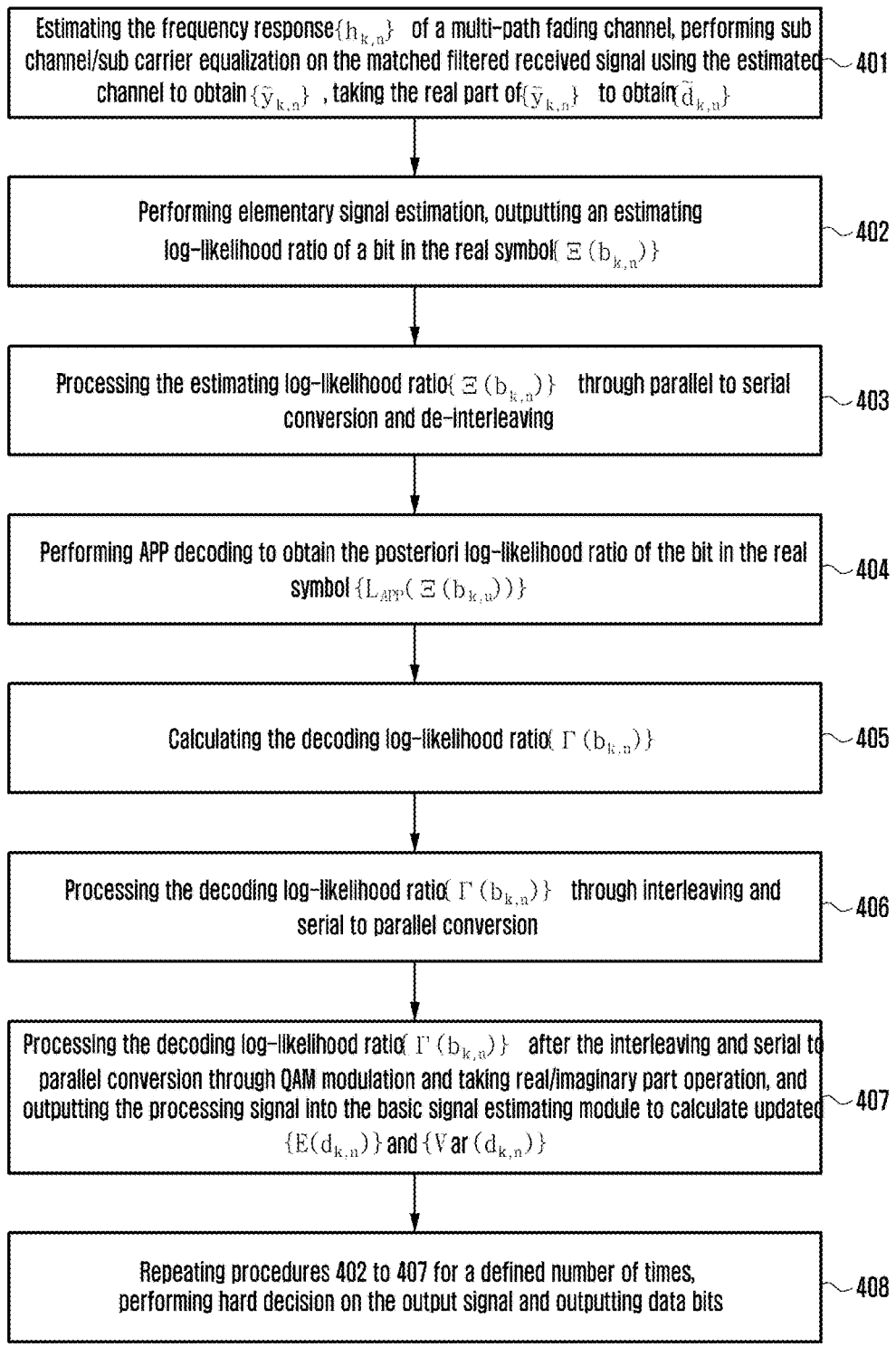
FIG. 4 is a flowchart illustrating a work flow of an iterative interference cancellation receiver in accordance with embodiment one of the present disclosure.

Referring to FIG. 4, the work flow of the iterative interference cancellation receiver of embodiment one is described further as follows.

At block 401, a frequency response $\{h_{k,n}\}$ of a multi-path fading channel is estimated, the estimated channel is used in sub-channel/sub-carrier equalization (formula (19)) of received signal after matched filtering (formula (18)) to obtain $\{\tilde{y}_{k,n}\}$. The sub-channel/sub-carrier equalization may obey the MMSE criterion, or the ZF criterion and/or the MRC criterion. Then, a taking real part operation is applied to $\{\tilde{y}_{k,n}\}$ to generate $\{\tilde{d}_{k,n}\}$ which is outputted to the iterative interference cancellation module.

At block 402, an elementary signal estimator in the iterative interference cancellation module calculates the mean value $\{E(R\{\xi_{k,n}\})\}$ and the variance $\{VAR(R\{\xi_{k,n}\})\}$ of an interference component corresponding to a transmitted signal using the mean value $\{E(d_{k,n})\}$ and the variance $\{Var(d_{k,n})\}$ of the transmitted signal. Initial values of $\{E(d_{k,n})\}$ and $\{Var(d_{k,n})\}$ are set to be zeros. An estimating log-likelihood ratio $\xi(b_{k,n}(u))$ of a bit in a real symbol is calculated (formula (34)) and outputted using $\{E(R\{\xi_{k,n}\})\}$ and $\{Var(R\{\xi_{k,n}\})\}$ together with the conditional probability density function of $\{\tilde{d}_{k,n}\}$.

At block 403, the estimating log-likelihood ratio $\Xi(b_{k,n})$ obtained in block 402 is processed through parallel to serial conversion and de-interleaving, and the result is outputted to a soft decoder in the iterative interference cancellation module.

At block 404, the soft decoder applies APP decoding to the estimating log-likelihood ratio after the parallel to serial conversion and de-interleaving to obtain a posteriori log-likelihood $L_{APP}(\Xi(b_{k,n}(u)))$ ratio of the bit of the real symbol. The APP decoding algorithm may be the Bahl-Cocke-Jelinek-Raviv (BCJR) algorithm.

At block 405, the soft decoder calculates (formula (36)) a decoding log-likelihood ratio $\Gamma(b_{k,n}(u))$ of the bit in the real symbol using the a posteriori log-likelihood ratio and the estimating log-likelihood ratio obtained in block 404 according to the Bayesian theory.

At block 406, the decoding log-likelihood ratio $\Gamma(b_{k,n})$ obtained in block 405 is processed through a decision operation, interleaving and serial to parallel conversion.

At block 407, the decoding log-likelihood ratio $\Gamma(b_{k,n})$ after the decision operation, interleaving and serial to parallel conversion is processed through QAM modulation and a taking real/imaginary part operation, and a result obtained is fed back to the elementary signal estimator for calculating and updating the mean value $\{E(d_{k,n})\}$ and the variance $\{Var(d_{k,n})\}$ of the transmitted signal in block 402 in the next iteration procedure.

At block 408, procedures in blocks 402-407 are repeated for a pre-defined number of times. After the procedures are repeated for the pre-defined number of times, output of the soft decoder is processed through a hard decision operation to obtain outputted data bits.

Embodiment Two

In the iterative interference cancellation process applied on the received signal in embodiment one, initial values of the mean value $\{E(d_{k,n})\}$ and the variance $\{Var(d_{k,n})\}$ of the transmitted signal are both set to be zeros. Embodiment two provides a method of calculating the initial values of the mean value $\{E(d_{k,n})\}$ and the variance of $\{Var(d_{k,n})\}$ of a transmitted signal to facilitate the iterative interference cancellation process of embodiment one and enable fast convergence of algorithm performance.

Figure 5:
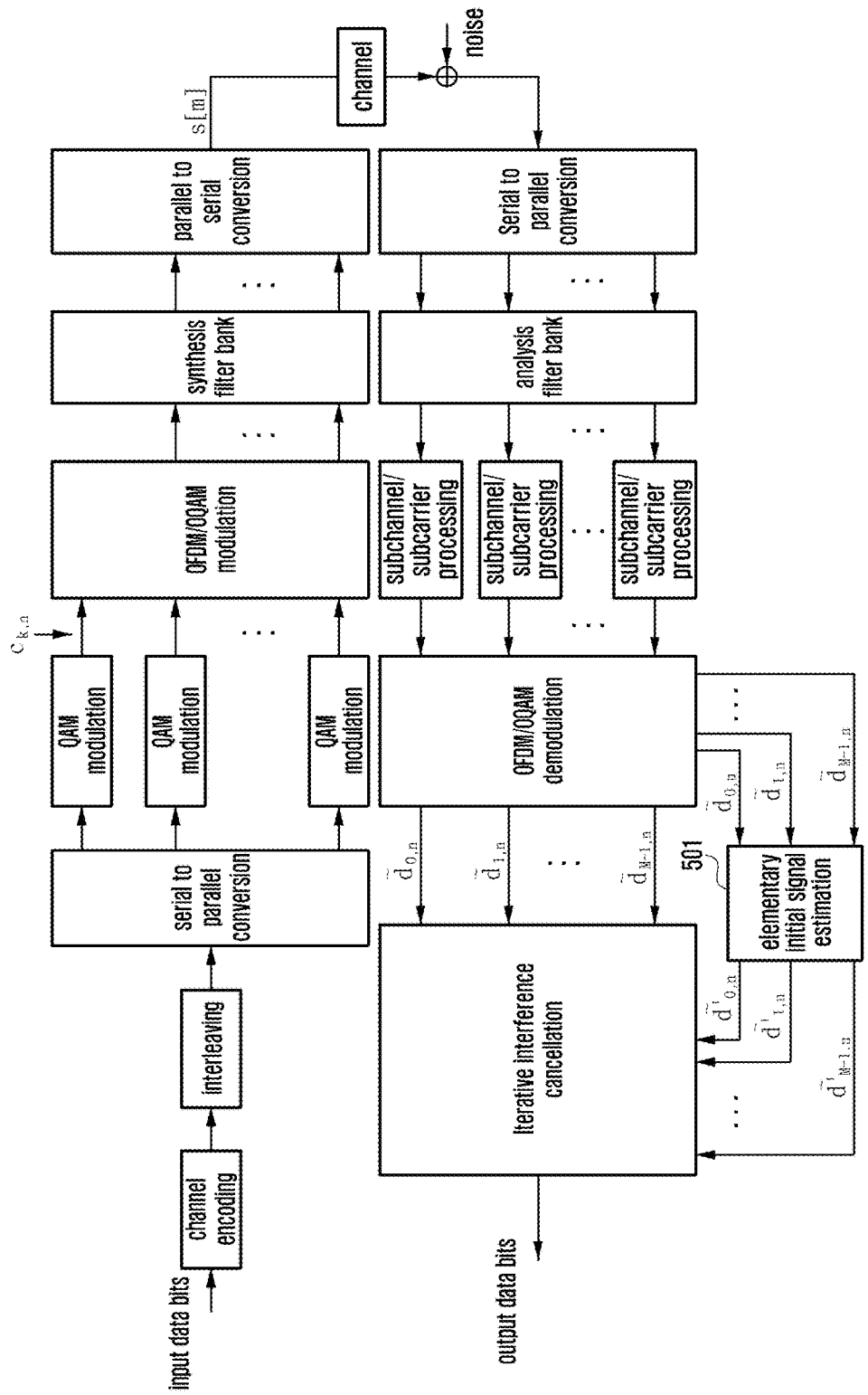
FIG. 5 is a schematic diagram illustrating the principle of a transmitter and a receiver in an FBMC/OQAM system using an iterative interference cancellation receiver in accordance with embodiment two of the present disclosure.

FIG. 5 is a schematic diagram illustrating the principle of a transmitter and a receiver in an FBMC/OQAM system using an iterative interference cancellation receiver in accordance with embodiment two of the present disclosure. It can be seen from FIG. 5 and FIG. 2 that the method of embodiment two is different from embodiment one in that the real symbol $\{\tilde{d}_{k,n}\}$ is also inputted into the elementary initial signal estimator 501 when inputted into the iterative interference cancellation module. The real symbol $\{\hat{d}'_{k,n}\}$ outputted by the elementary initial signal estimator 501 is part of input signal of the iterative interference cancellation module for initializing $\{E(d_{k,n})\}$ and $\{Var(d_{k,n})\}$.

Figure 6:
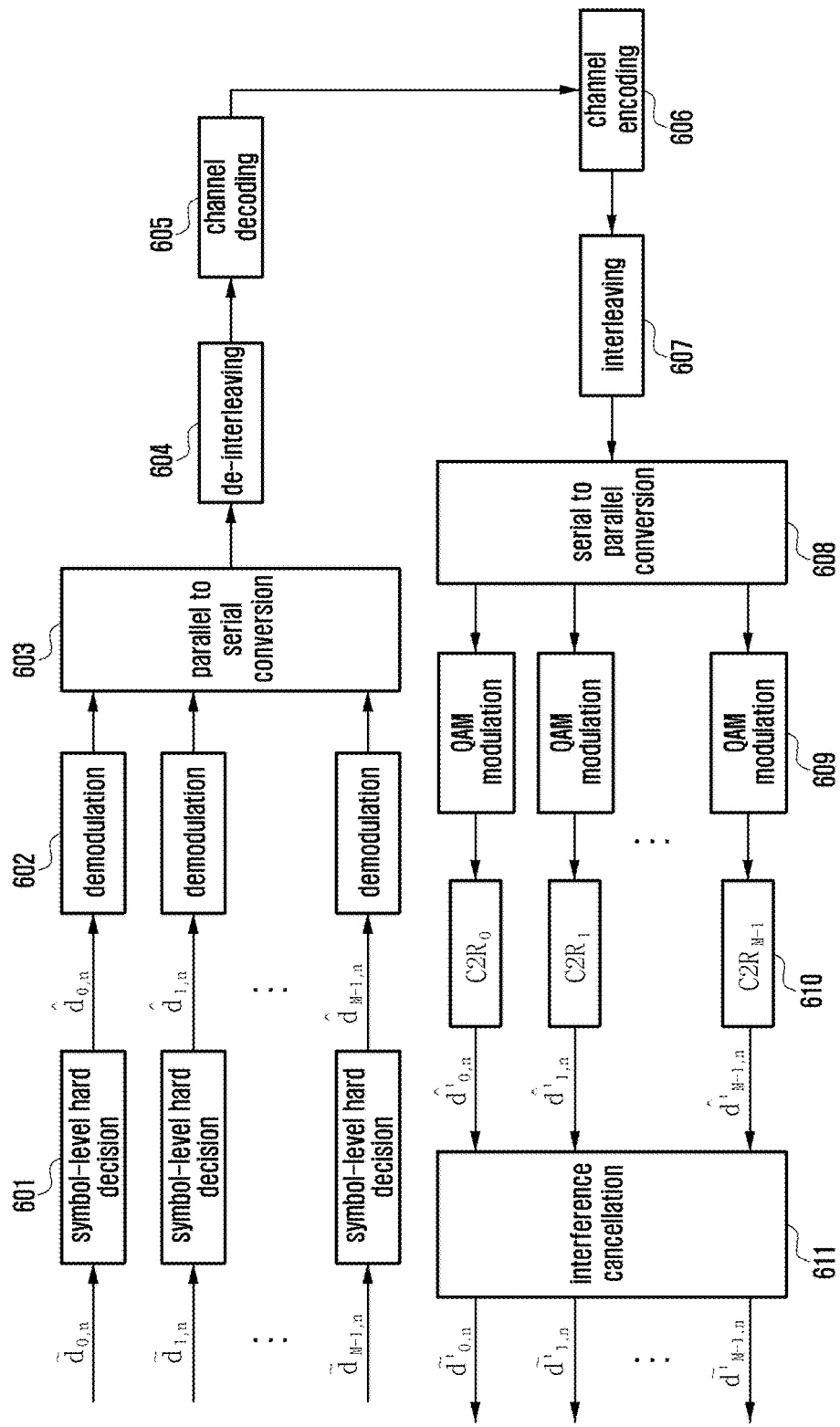
FIG. 6 is a schematic diagram illustrating the design principle of an elementary initial signal estimator in accordance with embodiment two of the present disclosure.

FIG. 6 is a schematic diagram illustrating the design principle of an elementary initial signal estimator in accordance with embodiment two of the present disclosure. As shown in FIG. 6, the real symbol $\{\tilde{d}_{k,n}\}$ is first processed by a symbol level hard decision module 601, a demodulator 602 and a parallel to serial conversion module 603, and then inputted into a de-interleaving module 604. The de-interleaved data bits are processed by a channel decoder 605, then encoded by a channel encoder 606 and then processed by an inter-leaving module 607. The result obtained is processed by a serial to parallel conversion module 608, a QAM modulation module 609 and a taking real/imaginary part module 610, and then is inputted into the interference cancellation module 611. Finally, the output $\{\hat{d}'_{k,n}\}$ of the interference cancellation module 611 is inputted into the iterative interference cancellation module of embodiment one to implement initialization of the parameter.

Firstly, the output of the symbol-level hard decision module 601 can be calculated according to:

$$\hat{d}_{k,n}=Z(\tilde{d}_{k,n})=Z(\Re\{\tilde{y}_{k,n}\})=Z(\Re\{\phi^*_{k,n}y_{k,n}\}) \quad (37)$$

In the above formula, Z(•) denotes applying a minimum Euclidean distance-based hard decision operation to a constellation symbol to which a symbol is mapped.

After $\{\hat{d}_{k,n}\}$ is processed through modules 602-609, an estimated symbol after channel encoding/decoding is obtained, which is expressed as:

$$\hat{d}'_{k,n}=H(\hat{d}_{k,n}) \quad (38)$$

In the formula, K(•) denotes the operation performed by modules 602-609. $\{\hat{d}'_{k,n}\}$ is inputted into the interference cancellation module 611 which outputs a real symbol $\{\hat{d}'_{k,n}\}$. In an example, after the processing of the interference cancellation module 611, the received symbol at time-frequency grid point $(k_0,n_0)$ can be expressed as:

$$\tilde{d}'_{k_0,n_0} = \Re\left\{\tilde{y}_{k_0,n_0} - \sum_{(k,n)\neq(k_0,n_0)} \hat{d}'_{k,n}\phi^*_{k_0,n_0}h_{k,n}\sum_{m=-\infty}^{\infty} g_{k,n}[m]f_{k_0,n_0}[m]\right\} \quad (39)$$

After that, $\tilde{d}'_{k_0,n_0}$ is inputted into the iterative interference cancellation module to update the initial mean value $E(d_{k_0,n_0})$ and initial variance value $Var(d_{k_0,n_0})$ of the real symbol $d_{k_0,n_0}$, and the process can be expressed as:

$$E(d_{k_0,n_0})=\tilde{d}'_{k_0,n_0} \quad (40)$$

$$Var(d_{k_0,n_0})=1-(E(d_{k_0,n_0}))^2 \quad (41)$$

In an example, the initial interference cancellation may include an iterative process.

Figure 7:
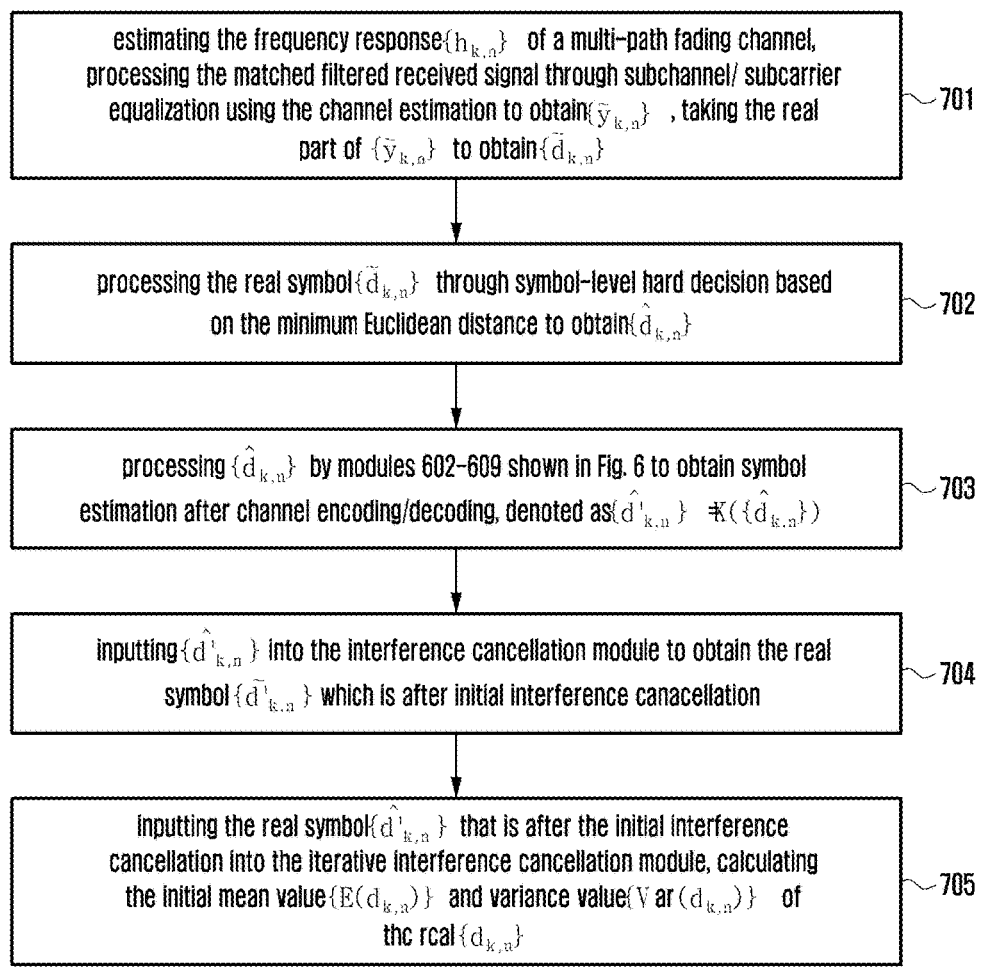
FIG. 7 is a flowchart illustrating a work flow of an iterative interference cancellation receiver using the elementary initial signal estimator in accordance with embodiment two of the present disclosure.

FIG. 7 is a flowchart illustrating a work flow of an iterative interference cancellation receiver using the elementary initial signal estimator in accordance with embodiment two of the present disclosure.

At block 701, a frequency response $\{h_{k,n}\}$ of a multi-path fading channel is estimated, the channel estimation is used in sub-channel/sub-carrier equalization (formula (19)) of received signal after matched filtering (formula (18)) to obtain $\{\tilde{y}_{k,n}\}$. The sub-channel/sub-carrier equalization may obey the MMSE criterion, or the ZF criterion and/or the MRC criterion. Then, the real part of $\{\tilde{y}_{k,n}\}$ is taken obtaining $\{\tilde{d}_{k,n}\}$, and $\{\tilde{d}_{k,n}\}$ is inputted into the iterative interference cancellation module and the elementary initial signal estimator.

At block 702, the elementary initial signal estimator makes a symbol level minimum Euclidean distance-based hard decision using the $\{\tilde{d}_{k,n}\}$ obtained in block 701, and obtains $\{\hat{d}_{k,n}\}=\{Z(\tilde{d}_{k,n})\}$.

At block 703, the elementary initial signal estimator processes the $\{\hat{d}_{k,n}\}$ obtained in block 702 through demodulation, parallel to serial conversion and de-interleaving, and processes bits obtained through channel decoding, channel encoding and interleaving. The result obtained is processed through serial to parallel conversion, QAM modulation and taking real/imaginary part operation, and $\{\hat{d}'_{k,n}\}=\{K(\hat{d}_{k,n})\}$ outputted.

At block 704, $\{\hat{d}'_{k,n}\}$ is inputted into the interference cancellation module in the elementary initial signal estimator and real symbols $\{\tilde{d}'_{k,n}\}$ after initial interference cancellation are obtained.

At block 705, the real symbols $\{\tilde{d}'_{k,n}\}$ after the initial interference cancellation obtained in block 704 are inputted into the iterative interference cancellation module for calculating the initial mean value $\{E(d_{k,n})\}$ and the initial variance value $\{Var(d_{k,n})\}$ of the real symbols $\{d_{k,n}\}$. That is, $\{E(d_{k,n})\}=\{\tilde{d}'_{k,n}\}$ and $\{Var(d_{k,n})\}=1-\{E(d_{k,n})\}^2$. The iterative interference cancellation module performs the subsequent interference cancellation described in embodiment one (blocks 402-408) using the inputted $\{\tilde{d}_{k,n}\}$ and the initialized $\{E(d_{k,n})\}$ and $\{Var(d_{k,n})\}$.

Embodiment Three

In the iterative interference cancellation process applied on the received signal in embodiment one, initial values of the mean value $\{E(d_{k,n})\}$ and the variance value $\{Var(d_{k,n})\}$ of the transmitted signal are both set to be zeros. Embodiment two provides a method of calculating the initial values of the mean value $\{E(d_{k,n})\}$ and the variance value $\{Var(d_{k,n})\}$ of a transmitted signal to facilitate the iterative interference cancellation process of embodiment one and enable fast convergence of algorithm performance. But the method of calculating the initial mean value $\{E(d_{k,n})\}$ and the initial variance value $\{Var(d_{k,n})\}$ of embodiment two does not perform interference pre-processing. Therefore, embodiment three provide an improved algorithm which performs interference pre-processing when calculating the initial mean value $\{E(d_{k,n})\}$ and the initial variance value $\{Var(d_{k,n})\}$, thus avoids impacts of error propagation on system performances while ensuring the fast convergence of algorithm performance.

Figure 8:
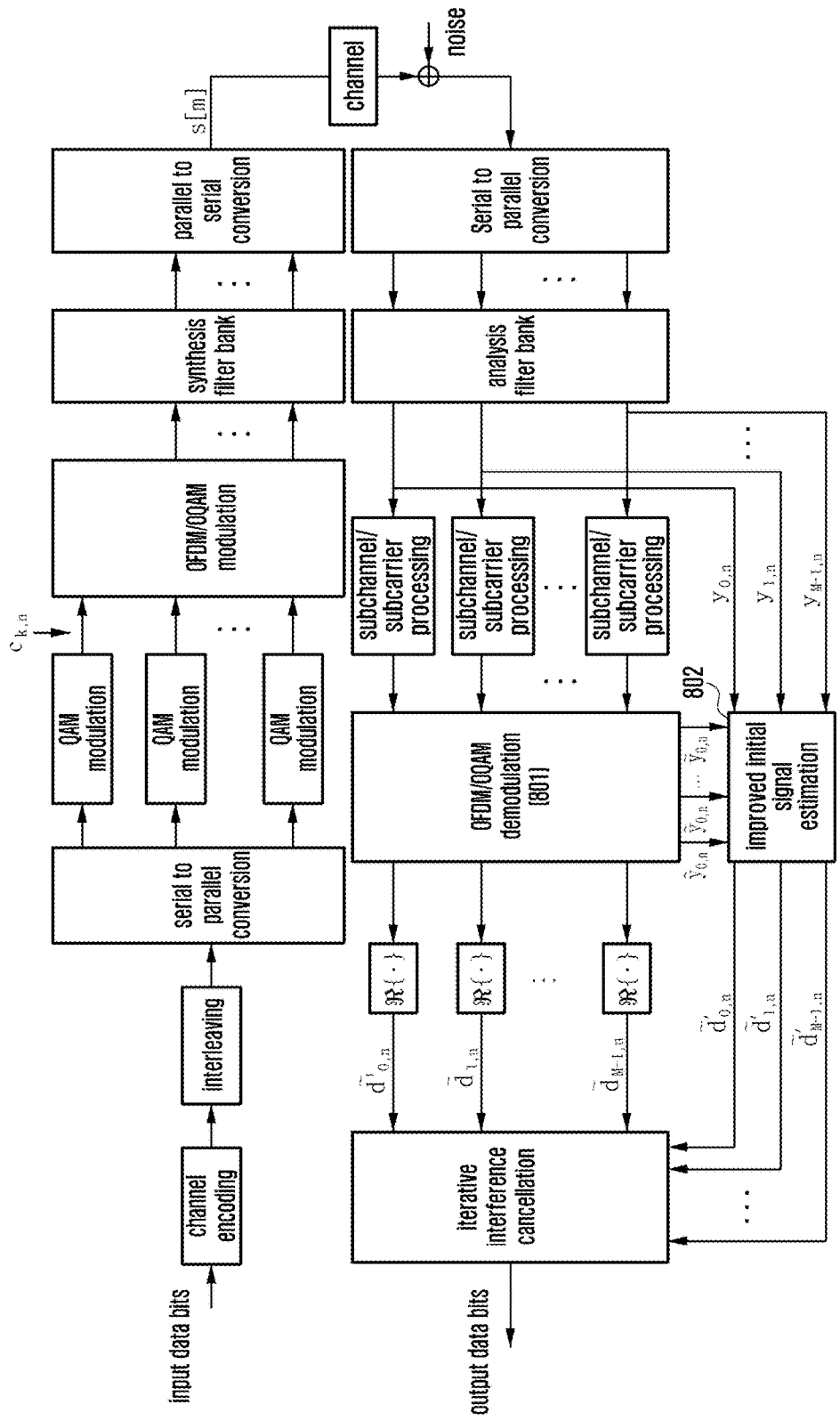
FIG. 8 is a schematic diagram illustrating the principle of a transmitter and a receiver in an FBMC/OQAM system using the iterative interference cancellation receiver in accordance with embodiment three of the present disclosure.

FIG. 8 is a schematic diagram illustrating the principle of a transmitter and a receiver in an FBMC/OQAM system using the iterative interference cancellation receiver in accordance with embodiment three of the present disclosure. It can be seen from comparison of FIG. 8 with FIG. 2 and FIG. 5, the method of embodiment three is different from that of embodiments one and two in that the FBMC/OQAM demodulation module 801 does not include the taking real part operation $\Re\{\bullet\}$, and the output signal is $\{\tilde{y}_{k,n}\}$. Then the real part of $\{\tilde{y}_{k,n}\}$ is taken, and the result $\{\tilde{d}_{k,n}\}=\{\Re\{\tilde{y}_{k,n}\}\}$ is inputted into the iterative interference cancellation module. Meanwhile, $\{\tilde{y}_{k,n}\}$ is inputted into an improved initialized signal estimator 802. The signal $\{\tilde{y}_{k,n}\}$ before sub-channel/sub-carrier equalization is also inputted into the improved initialized signal estimator 802. The real symbol $\{\tilde{d}'_{k,n}\}$ outputted by the improved initialized signal estimator 802 is part of input signal of the iterative interference cancellation module for implementing initialization of $\{E(d_{k,n})\}$ and $\{Var(d_{k,n})\}$.

Figure 9:
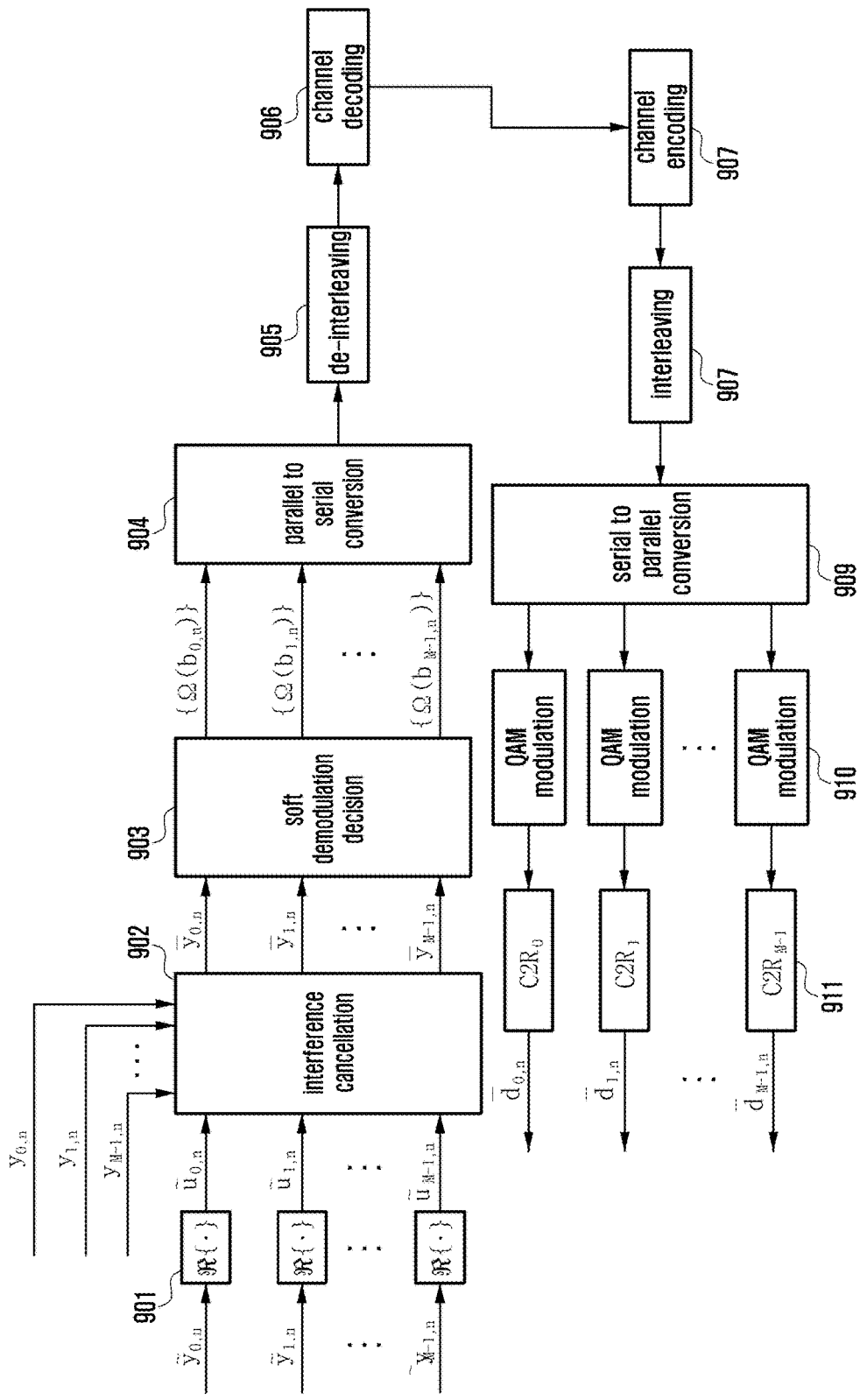
FIG. 9 is a schematic diagram illustrating the design principle of an improved initial signal estimator in accordance with embodiment three of the present disclosure.
Figure 10:
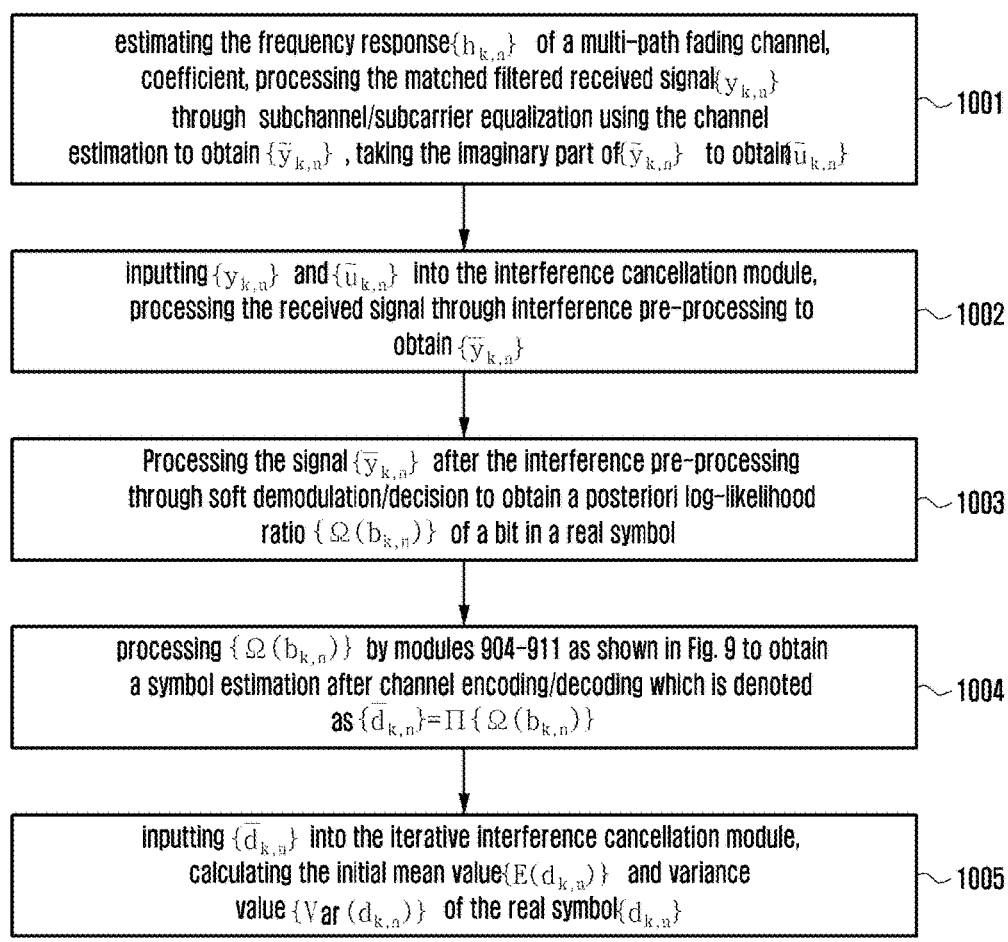
FIG. 10 is a flowchart illustrating a work flow of an iterative interference cancellation receiver using the improved initial signal estimator in accordance with embodiment three of the present disclosure.
Figure 11:
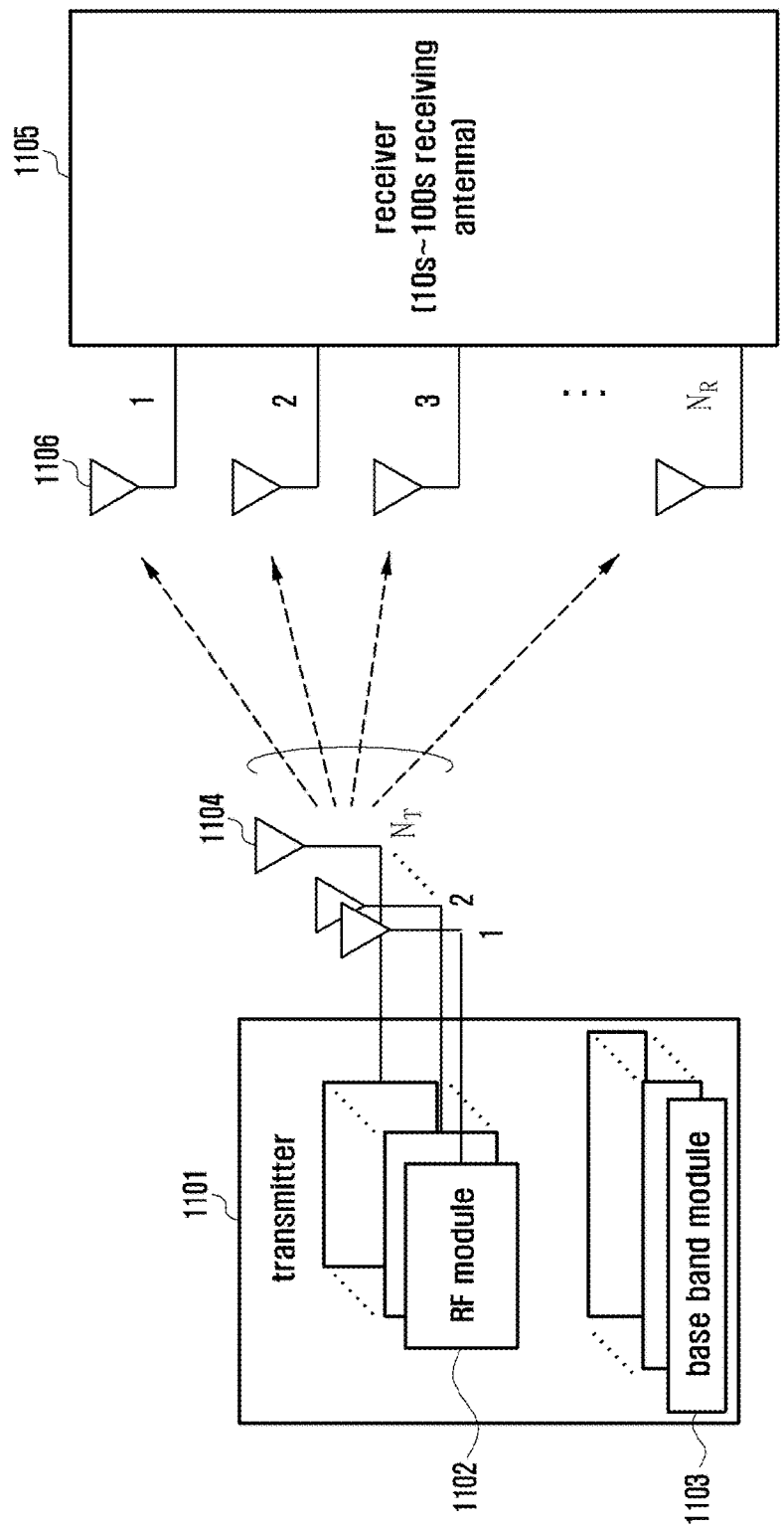
FIG. 11 is a schematic diagram illustrating a MIMO system in accordance with embodiment four of the present disclosure.
Figure 12:
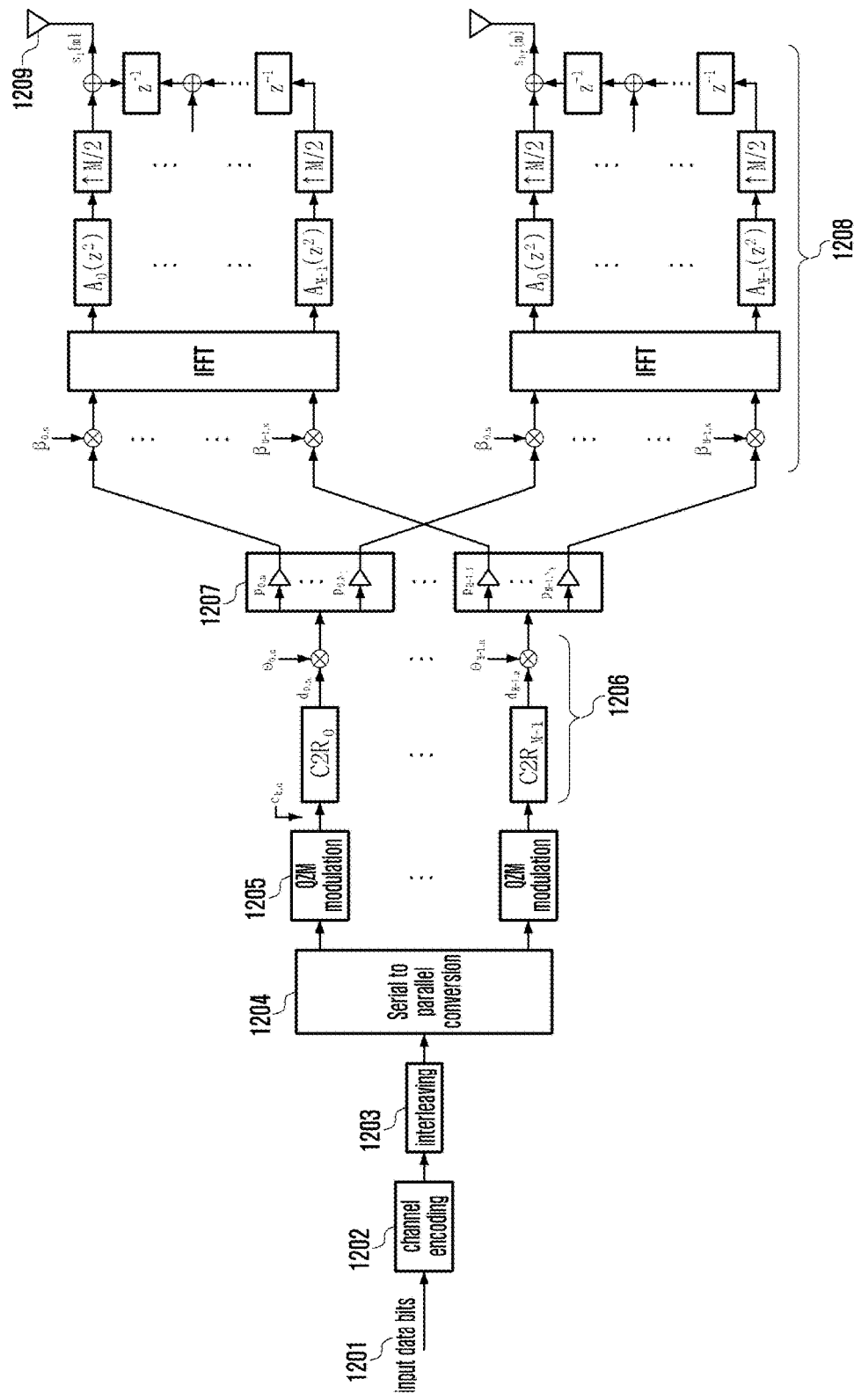
FIG. 12 is a schematic diagram illustrating the principle of a transmitter using a filter bank in a MIMO-FBMC/OQAM system in accordance with embodiment four of the present disclosure.
Figure 13:
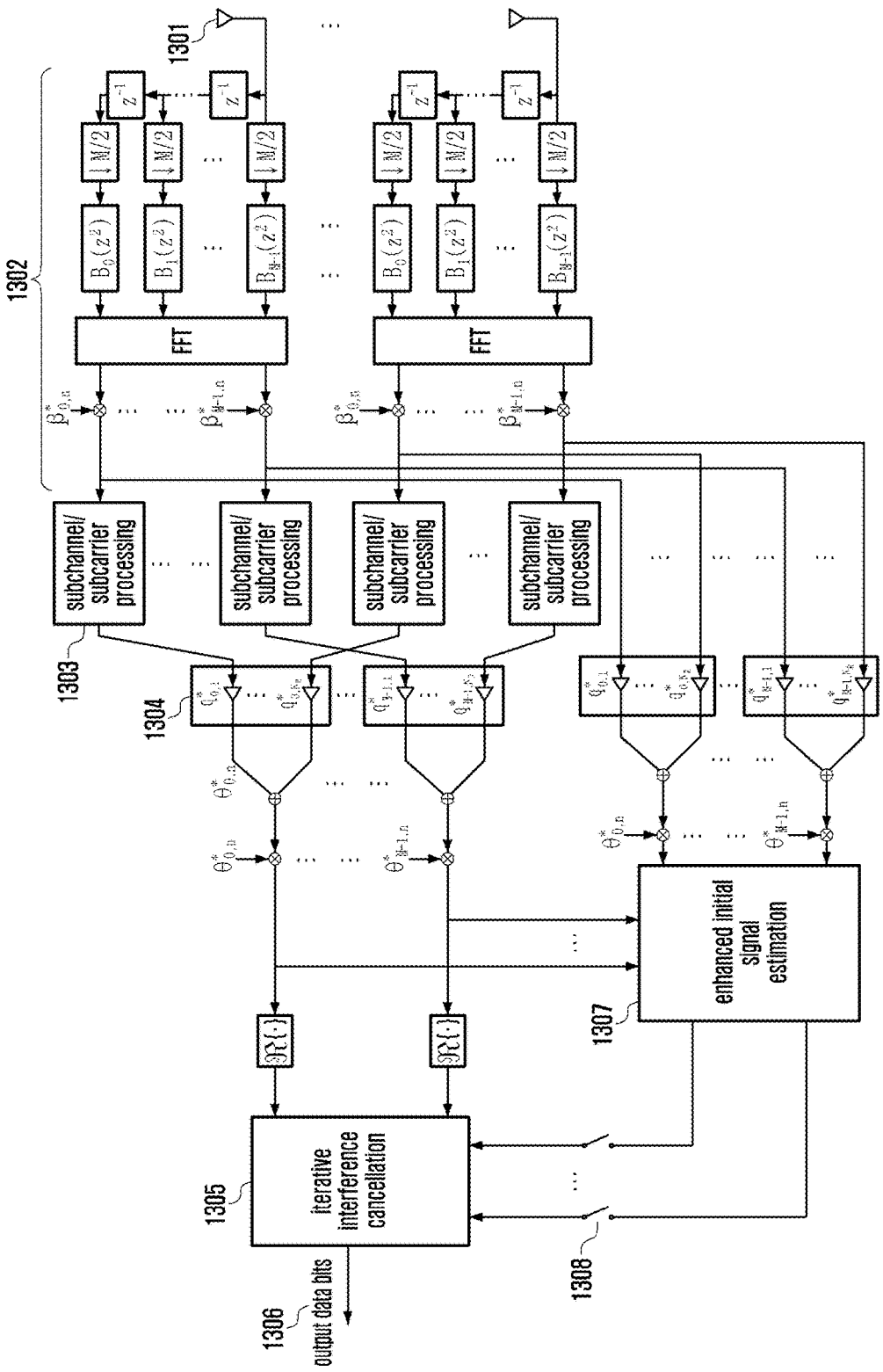
FIG. 13 is a schematic diagram illustrating the principle of a receiver in a MIMO FBMC/OQAM system using an iterative interference cancellation receiver in accordance with embodiment four of the present disclosure.
Figure 15:
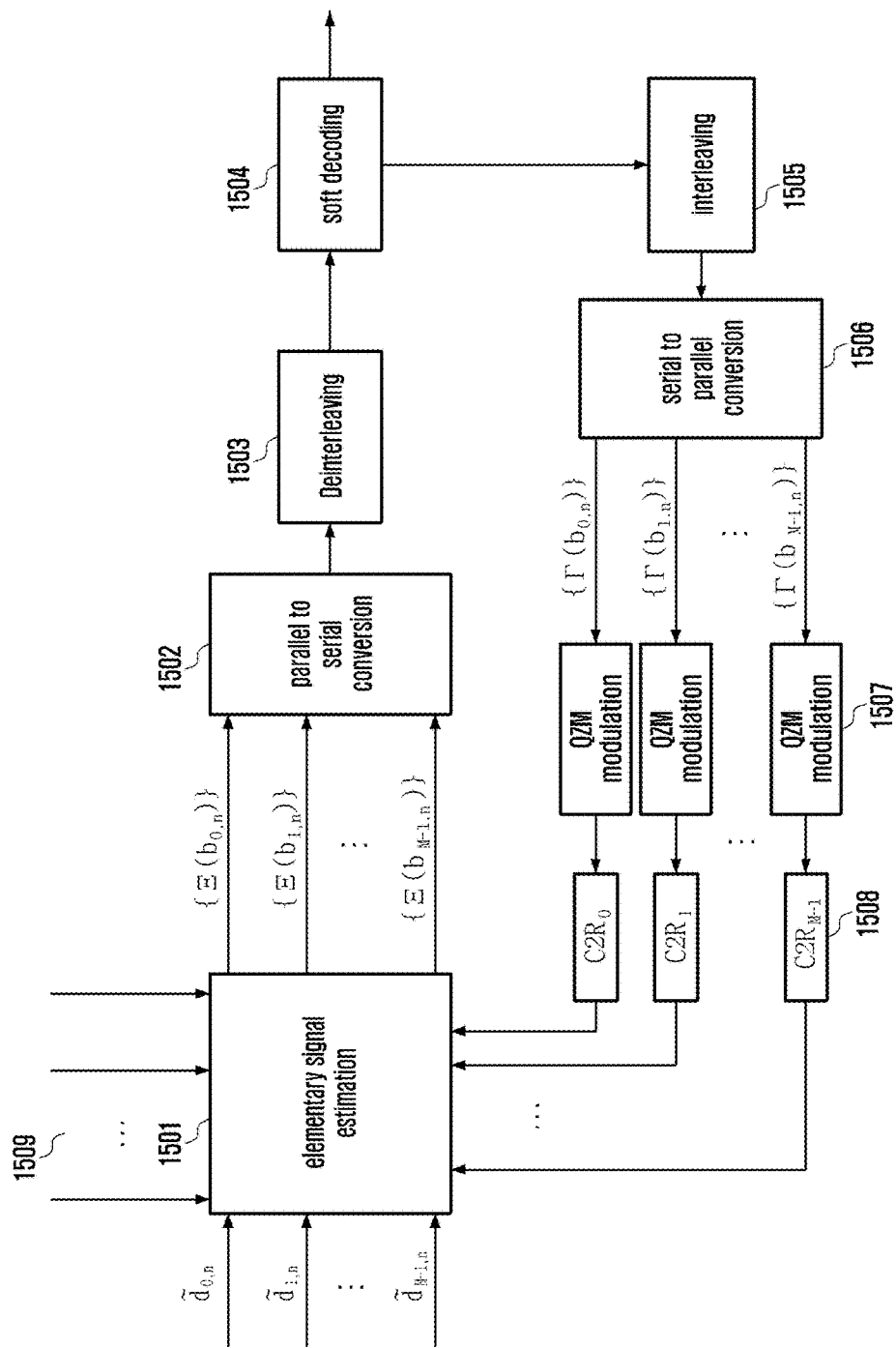
FIG. 15 is a schematic diagram illustrating the design principle of an iterative interference cancellation receiver in accordance with embodiment four of the present disclosure.
Figure 16:
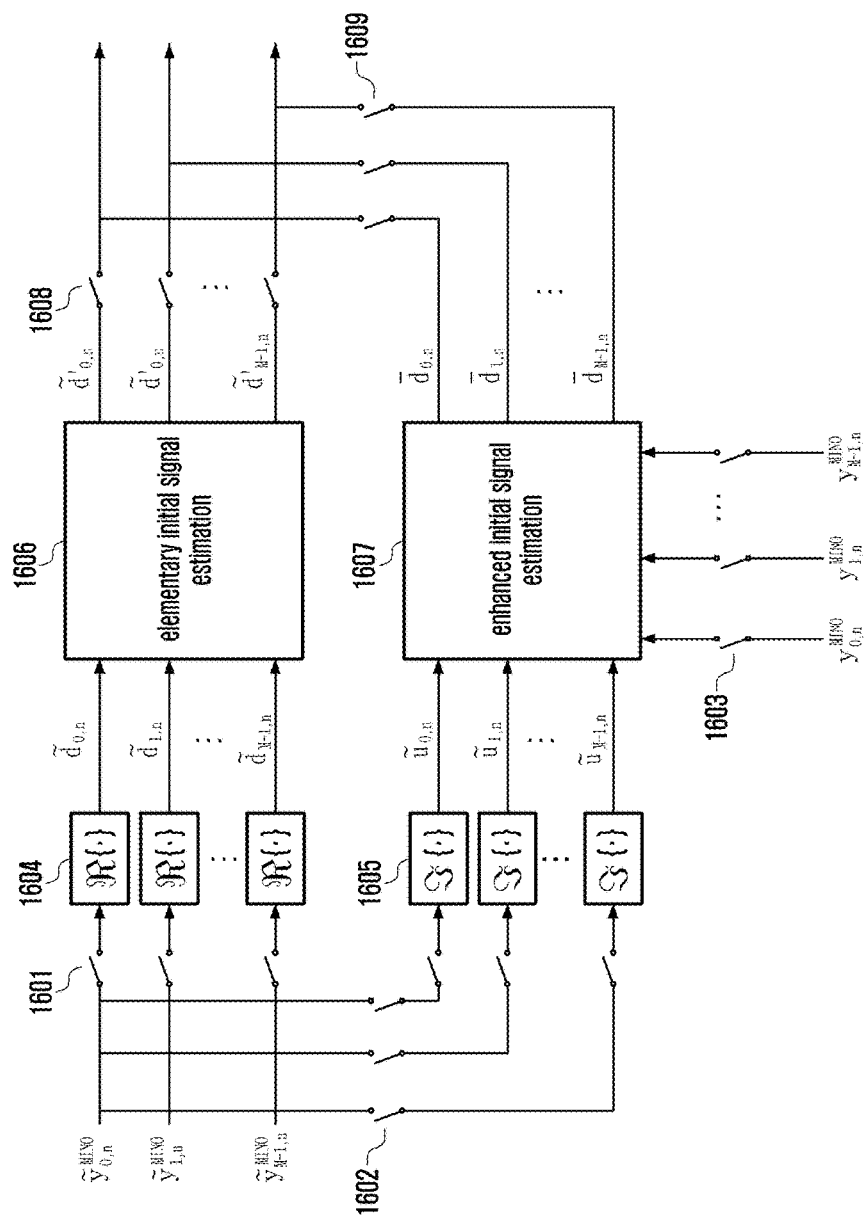
FIG. 16 is a schematic diagram illustrating the design principle of an enhanced initial signal estimator in accordance with embodiment four of the present disclosure.

FIG. 9 is a schematic diagram illustrating the design principle of an improved initial signal estimator in accordance with embodiment three of the present disclosure. As shown in FIG. 9, the imaginary part of the signal $\{\tilde{y}_{k,n}\}$ after sub-channel/sub-carrier equalization is taken, and the result $\{\tilde{u}_{k,n}\}$ is inputted to the interference cancellation module 902. In addition, the signal $\{y_{k,n}\}$ prior to the sub-channel/sub-carrier equalization is also inputted into the interference cancellation module 902. The output $\{\bar{y}_{k,n}\}$ of the interference cancellation module 902 is processed through a soft demodulation/decision module 903, and $\{\Omega(b_{k,n})\}$ is obtained $\{\Omega(b_{k,n})\}$ is processed by the parallel to serial conversion module 904, de-interleaving module 905 and the channel decoding module 906, and data bits are outputted. The outputted data bits are processed again through the channel encoding module 907, the inter-leaving module 908, the serial to parallel conversion module 909, the QAM modulation module 910 and the taking real/imaginary part module 911, and real symbols $\{\bar{d}_{k,n}\}$ are obtained. $\{\bar{d}_{k,n}\}$ is inputted into the iterative interference cancellation module to initialize the parameter.

Firstly, the output signal of the interference cancellation module 902 at time-frequency grid point $(k_0,n_0)$ can be expressed as:

$$\bar{y}_{k_0,n_0} = y_{k_0,n_0} - \sum_{(k,n)\neq(k_0,n_0)} jh_{k,n}\tilde{u}_{k_0,n_0} \quad (42)$$

In the formula, $\tilde{u}_{k0,n0}=\Im\{\tilde{y}_{k0,n0}\}$ is the estimated value of interference at time-frequency grid point $(k_0,n_0)$. $\bar{y}_{k0,n0}$ can be regarded as the signal obtained by processing $y_{k0,n0}$ through initial interference pre-processing, and is inputted into the soft demodulation/decision module 903. In an example, the initial interference pre-processing may include an iterative process. Assuming the interference has been eliminated, the inputted $\bar{y}_{k0,n0}$ is decoded using an APP decoding algorithm, the posteriori log-likelihood ratio $L_{APP}(b_{k0,n0}(u)|\bar{y}_{k0,n0})$ of the u-th bit in the real symbol $d_{k0,n0}$ is:

$$L_{APP}(b_{k_0,n_0}(u)|\bar{y}_{k_0,n_0}) = \log\left(\frac{P(b_{k_0,n_0}(u) = +1|\bar{y}_{k_0,n_0})}{P(b_{k_0,n_0}(u) = -1|\bar{y}_{k_0,n_0})}\right) \quad (43)$$

According to the Bayesian theory, formula (43) can be re-formulated as:

$$L_{APP}(b_{k_0,n_0}(u)|\bar{y}_{k_0,n_0}) = \log\left(\frac{\sum_{b_{k_0,n_0}\in D^+_{k_0,n_0}} P(\bar{y}_{k_0,n_0}|b_{k_0,n_0})}{\sum_{b_{k_0,n_0}\in D^-_{k_0,n_0}} P(\bar{y}_{k_0,n_0}|b_{k_0,n_0})}\right) \quad (44)$$

In the formula, $D_{k_0,n_0}^+$ and $D_{k_0,n_0}^-$ respectively denote a set including all +1 bits and a set including all −1 bits contained in $b_{k0,n0}$. $P(\bar{y}_{k_0,n_0}|b_{k_0,n_0})$ can be expressed as:

$$P(\bar{y}_{k_0,n_0}|b_{k_0,n_0}) = \frac{\exp\left(-\frac{1}{2\sigma_0^2}(y_{k_0,n_0} - h_{k_0,n_0}d_{k_0,n_0})^2\right)}{2\pi\sigma_0^2} \quad (45)$$

Substituting formula (45) into formula (44) and using a Max-Log approximation algorithm, it can be obtained that:

$$\Omega(b_{k_0,n_0}(u)) = L_{APP}(b_{k_0,n_0}(u)|\bar{y}_{k_0,n_0}) \quad (46)$$
$$= \frac{1}{2\sigma_0^2}\min_{b_{k_0,n_0}\in D^+_{k_0,n_0}}(y_{k_0,n_0} - h_{k_0,n_0}d_{k_0,n_0})^2 -$$
$$\frac{1}{2\sigma_0^2}\min_{b_{k_0,n_0}\in D^-_{k_0,n_0}}(y_{k_0,n_0} - h_{k_0,n_0}d_{k_0,n_0})^2.$$

The obtained soft bits $\Omega(b_{k0,n0}(u))$ are processed through parallel to serial conversion and de-interleaving. The result is processed through channel decoding, and then through channel encoding and interleaving again. The result obtained is processed through serial to parallel conversion, QAM modulation and taking real/imaginary part operation, and the output is expressed as:

$$\bar{d}_{k_0,n_0} = \pi(\Omega(b_{k_0,n_0})) \quad (47)$$

In the formula, $\pi(\bullet)$ denotes the operation performed by modules 904-911.

After that, $\bar{d}_{k0,n0}$ is inputted into the iterative interference cancellation module to update the initial mean value $E(d_{k0,n0})$ and initial variance value $Var(d_{k0,n0})$ of the real symbol $d_{k0,n0}$, and the process can be expressed as:

$$E(d_{k_0,n_0})=\bar{d}_{k_0,n_0} \quad (48)$$

$$Var(d_{k_0,n_0})=1-(E(d_{k_0,n_0}))^2 \quad (49)$$

The output of the symbol level hard decision module 601 may be calculated according to:

$$\hat{d}_{k,n} = Z(\tilde{d}_{k,n}) = Z(\mathcal{R}\{\tilde{y}_{k,n}^{MIMO}\}) = Z\left(\mathcal{R}\left\{\sum_{n_r=1}^{N_R}\sum_{n_t=1}^{N_T}\left((h_{k,n}^{(n_t,n_r)})^* y_{k,n}^{n_r}\right)\right\}\right) \quad (65)$$

In the above formula, Z(•) denotes applying a minimum Euclidean distance-based hard decision operation to a constellation symbol to which a symbol is mapped.

After $\{\hat{d}_{k,n}\}$ is processed by modules 602-609, estimated symbols after channel encoding/decoding are expressed as $\{\hat{d}'_{k,n}\}=K(\hat{d}_{k,n})$. In the formula, K(•) denotes the operations performed by modules 602-609. $\{\hat{d}'_{k,n}\}$ is inputted into the interference cancellation module 611 which outputs real symbols $\{\tilde{d}'_{k,n}\}$ after initial interference cancellation. In an example, after the processing of the interference cancellation module 611, the received symbols at time-frequency grid point $(k_0,n_0)$ can be expressed as:

$$\tilde{d}'_{k_0,n_0} = \Re\left\{\tilde{y}^{MIMO}_{k,n} - \sum_{n_r=1}^{N_R}\sum_{n_t=1}^{N_T}\sum_{(k,n)\in\Omega_{(k_0,n_0)}} \hat{d}'_{k,n}(h^{(n_t,n_r)}_{k_0,n_0})^* \right.$$
$$\left. h^{(n_t,n_r)}_{k,n} \sum_{m=-\infty}^{\infty} g_{k,n}[m]f_{k_0,n_0}[m] \right\} \quad (66)$$

Then, $\tilde{d}'_{k_0,n_0}$ is inputted into the iterative interference cancellation module 1305 of embodiment four for updating the initial mean value $E(d_{k_0,n_0})=\tilde{d}'_{k_0,n_0}$ and the initial variance value $Var(d_{k0,n0})=1-(E(d_{k0,n0}))^2$ of the real symbols $d_{k0,n0}$. In an example, the initial interference cancellation may include an iterative process.

If the switches 1602, 1603 and 1609 are switched on, switches 1601 and 1608 are correspondingly switched off to switch on the improved initial signal estimator 1607 in the enhanced initial signal estimator. Firstly, inputted $\{\tilde{y}^{MIMO}_{k,n}\}$ are processed through the taking imaginary part operation to obtain $\{\tilde{u}_{k,n}\}=\{\Im\{\tilde{y}^{MIMO}_{k,n}\}\}$. The signal $\{y^{MIMO}_{k,n}\}$ before sub-channel/sub-carrier equalization is also inputted into the improved initial signal estimator. In an example, the received symbols $y^{MIMO}_{k_0,n_0}$ at the time-frequency grid point $(k_0,n_0)$ may be expressed as:

$$y^{MIMO}_{k_0,n_0} = \quad (67)$$
$$\sum_{n_r=1}^{N_R}\sum_{n_t=1}^{N_T}\left(h^{(n_t,n_r)}_{k_0,n_0}d_{k_0,n_0}p_{k_0,n_t}q^*_{k_0,n_r} + \sum_{(k,n)\neq(k_0,n_0)} d_{k,n}p_{k,n_t}q^*_{k_0,n_r}\right.$$
$$\left. h^{(n_t)}_{k,n}\sum_{m=-\infty}^{\infty} g_{k,n}[m]f_{k_0,n_0}[m]\right) + \kappa_{k_0,n_0}$$

In the formula, $$\kappa_{k_0,n_0} = \sum_{n_r=1}^{N_R} q^*_{k_0,n_r}v^{n_r}_{k_0,n_0}.$$

The improved initial signal estimator 1607 processes $\{\tilde{u}_{k,n}\}$ and $\{y^{MIMO}_{k,n}\}$, and outputs $\{\overline{d}_{k,n}\}$. In an example, the improved initial signal estimator 1607 of embodiment four has almost the same structure and functions with the improved initial signal estimator 802 of embodiment three. For simplicity, the following description refers to FIG. 9. The output $\{\overline{y}^{MIMO}_{k,n}\}$ of the interference cancellation module 902 is processed through a soft demodulation/decision module 903, and $\{\Omega(b_{k,n})\}$ is obtained. $\{\Omega(b_{k,n})\}$ is processed by the parallel to serial conversion module 904, the de-interleaving module 905 and the channel decoding module 906, and data bits are outputted. The outputted data bits are processed again by the channel encoding module 907, the interleaving module 908, the serial to parallel conversion module 909, the QAM modulation 910 and the taking real/imaginary part module 911, and real symbols $\{\overline{d}_{k,n}\}$ are obtained. $\{\overline{d}_{k,n}\}$ are inputted into the iterative interference cancellation module 1305 of embodiment four for initializing certain parameter.

Firstly, the output signal of the interference cancellation module 902 at time-frequency grid point $(k_0,n_0)$ can be expressed as:

$$\overline{y}^{MIMO}_{k_0,n_0} = y^{MIMO}_{k_0,n_0} - \sum_{n_r=1}^{N_R}\sum_{n_t=1}^{N_T}\sum_{(k,n)\in\Omega_{(k_0,n_0)}} jh^{(n_t,n_r)}_{k,n}\tilde{u}_{k_0,n_0} \quad (68)$$

In the formula, $\tilde{u}_{k_0,n_0}=\Im\{\tilde{y}^{MIMO}_{k_0,n_0}\}$ is the estimated value of interference at time-frequency grid point $(k_0,n_0)$. $y^{MIMO}_{k_0,n_0}$ can be regarded as the signal obtained by processing $y^{MIMO}_{k_0,n_0}$ through initial interference pre-processing, and is inputted into the soft demodulation/decision module 903 In an example, the initial interference pre-processing may include an iterative process. Assuming the interference has been eliminated, the inputted $\overline{y}^{MIMO}_{k_0,n_0}$ is decoded using an APP decoding algorithm, the posteriori log-likelihood ratio $L_{APP}(b_{k_0,n_0}(u)|\overline{y}^{MIMO}_{k_0,n_0})$ of the u-th bit in the real symbol $d_{k0,n0}$ is:

$$L_{APP}(b_{k_0,n_0}(u)|\overline{y}^{MIMO}_{k_0,n_0}) = \log\left(\frac{P(b_{k_0,n_0}(u)=+1|\overline{y}^{MIMO}_{k_0,n_0})}{P(b_{k_0,n_0}(u)=-1|\overline{y}^{MIMO}_{k_0,n_0})}\right) \quad (69)$$

According to the Bayesian theory, formula (69) may be re-formulated to be:

$$L_{APP}(b_{k_0,n_0}(u)|\overline{y}^{MIMO}_{k_0,n_0}) = \log\left(\frac{\sum_{b_{k_0,n_0}\in D^+_{k_0,n_0}} P(\overline{y}^{MIMO}_{k_0,n_0}|b_{k_0,n_0})}{\sum_{b_{k_0,n_0}\in D^-_{k_0,n_0}} P(\overline{y}^{MIMO}_{k_0,n_0}|b_{k_0,n_0})}\right) \quad (70)$$

In the formula, $D^+_{k_0,n_0}$ and $D^-_{k_0,n_0}$ respectively denote a set including all +1 bits and a set including all −1 bits in $b_{k0,n0}$. $P(\overline{y}^{MIMO}_{k_0,n_0}|b_{k_0,n_0})$ can be expressed as:

$$P(\overline{y}^{MIMO}_{k_0,n_0}|b_{k_0,n_0}) = \frac{\exp\left(-\frac{1}{2\sigma_0^2}\left(y^{MIMO}_{k_0,n_0} - \sum_{n_r=1}^{N_R}\sum_{n_t=1}^{N_T} h^{(n_t,n_r)}_{k_0,n_0}d_{k_0,n_0}\right)^2\right)}{2\pi\sigma_0^2} \quad (71)$$

Substituting formula (71) into formula (70) and using a Max-Log approximation algorithm, it can be obtained that:

$$\Omega(b_{k_0,n_0}(u)) = L_{APP}(b_{k_0,n_0}(u)|\overline{y}^{MIMO}_{k_0,n_0}) \quad (72)$$

-continued $$= \frac{1}{2\sigma_0^2} \min_{b_{k_0,n_0} \in D_{k_0,n_0}^-} \left( y_{k_0,n_0}^{MIMO} - \sum_{n_r=1}^{N_R} \sum_{n_t=1}^{N_T} h_{k_0,n_0}^{(n_t,n_r)} d_{k_0,n_0} \right)^2 -$$

$$\frac{1}{2\sigma_0^2} \min_{b_{k_0,n_0} \in D_{k_0,n_0}^+} \left( y_{k_0,n_0}^{MIMO} - \sum_{n_r=1}^{N_R} \sum_{n_t=1}^{N_T} h_{k_0,n_0}^{(n_t,n_r)} d_{k_0,n_0} \right)^2$$

The obtained soft data bits $\Omega(b_{k_0,n_0}(u))$ are processed through parallel to serial conversion and de-interleaving. The result is processed through channel decoding, and then through channel encoding and interleaving again. The result obtained is processed through serial to parallel conversion, QAM modulation and a taking real/imaginary part operation, and the output is $\bar{d}_{k_0,n_0} = \pi(\Omega(b_{k_0,n_0}))$. In the formula, $\pi(\bullet)$ denotes the operations performed by modules 904-911. After that, $\bar{d}_{k_0,n_0}$ is inputted into the iterative interference cancellation module to update the initial mean value $E(d_{k_0,n_0}) = \bar{d}_{k_0,n_0}$ and initial variance value $Var(d_{k_0,n_0}) = 1 - (E(d_{k_0,n_0}))^2$ of the real symbol $d_{k_0,n_0}$.

Figure 17:
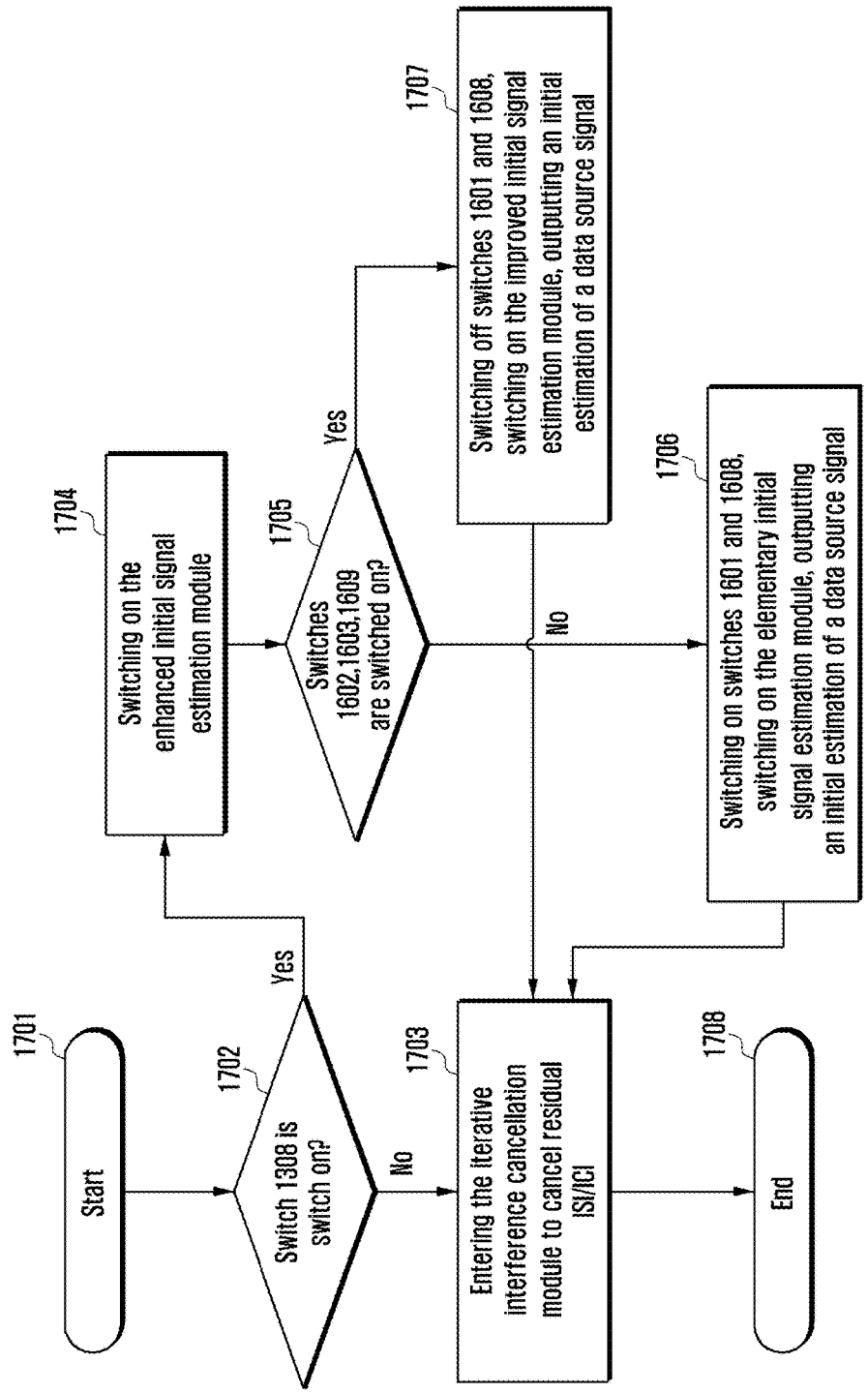
FIG. 17 is a flowchart illustrating a work flow of an iterative interference cancellation receiver using the enhanced initial signal estimator in accordance with embodiment four of the present disclosure.

FIG. 17 is a flowchart illustrating a work flow of an iterative interference cancellation receiver using the enhanced initial signal estimator in accordance with embodiment four of the present disclosure.

At block 1701, the receiver performs initialization operations, processes a received signal through matched filtering, sub-channel/sub-carrier equalization, synthesizing, taking the real part, and the like.

At block 1702, it determines whether the switch 1308 connecting the iterative interference cancellation receiver with the enhanced initial signal estimator is switched on or off.

At block 1703, if the switch 1308 is switched off, the signal initialized in block 1701 is inputted into the iterative interference cancellation module to cancel residual ISI/ICI in the MIMO-FBMC/OQAM system.

At block 1704, if the switch 1308 is switched off, the signal initialized in block 1701 is inputted into the enhanced initialized signal estimator.

At block 1705, it determines whether the switches 1602, 1603 and 1609 in the enhanced initialized signal estimator are switched on or off.

At block 1706, if the switches 1602, 1603 and 1609 are switched off, switches 1601 and 1608 are switched on to switch on the elementary initial signal estimator in the enhanced initialized signal estimator. The basic initialized signal estimator implements initial estimation of input signal from the data source, and inputs the initial estimation to the iterative interference cancellation module to initialize corresponding parameters in the iterative interference cancellation module.

At block 1707, if the switches 1602, 1603 and 1609 are switched on, switches 1601 and 1608 are switched off to switch on the improved initialized signal estimator in the enhanced initialized signal estimator. The improved initial signal estimator implements initial estimation of input signal from the data source, and inputs the initial estimation to the iterative interference cancellation module to initialize corresponding parameters in the iterative interference cancellation module.

At block 1708, the receiver makes a hard decision on the output of the iterative interference cancellation module, and outputs decided data source signal.

The complexity of the iterative interference cancellation method of embodiments four is related with the number of time-frequency grid point (k,n) ((k,n)≠(k$_0$,n$_0$)) surrounding the target time-frequency grid point (k$_0$,n$_0$) that cause serious interference. It can be seen from comparison of embodiment four with embodiments one, two and three, embodiments one, two and three take numerous interfering time-frequency grid points into consideration in the iterative interference cancellation of the target time-frequency grid point to ensure the interference component $\tilde{I}_{k_0,n_0}$ in formula (19) obeys the Gaussian distribution and satisfies the design condition of the iterative interference cancellation method, which increases the design complexity of the system. In embodiment four, the interference component $\tilde{I}_{k_0,n_0}^{MIMO}$ in formula (54) obeys the Gaussian distribution and satisfies the design condition of the iterative interference cancellation method as long as there are a large number of transmitting/receiving antennas. Therefore, only those interfering time-frequency grid points surrounding the target time-frequency grid point that cause severe interference, i.e., $(k,n) \in \Omega_{k_0,n_0}$, are considered in embodiment four during iterative interference cancellation for the target time-frequency grid point using the iterative interference cancellation algorithm. Taking the PHYDYAS prototype filter as shown in FIG. 14 as an example, $8 \leq |\Omega_{k_0,n_0}| \leq 18$. From comparison of embodiment four with embodiments one, two and three, the iterative interference cancellation algorithm of embodiment four has lower complexity.

Embodiment Five

The embodiments one, two, three and four respectively adopt the conventional SISO system model and the conventional MIMO system model. Embodiment five mainly addresses the mechanism and process of iterative interference cancellation algorithm used on the network side in uplink transmission in a distributed multi-antenna system.

Figure 18:
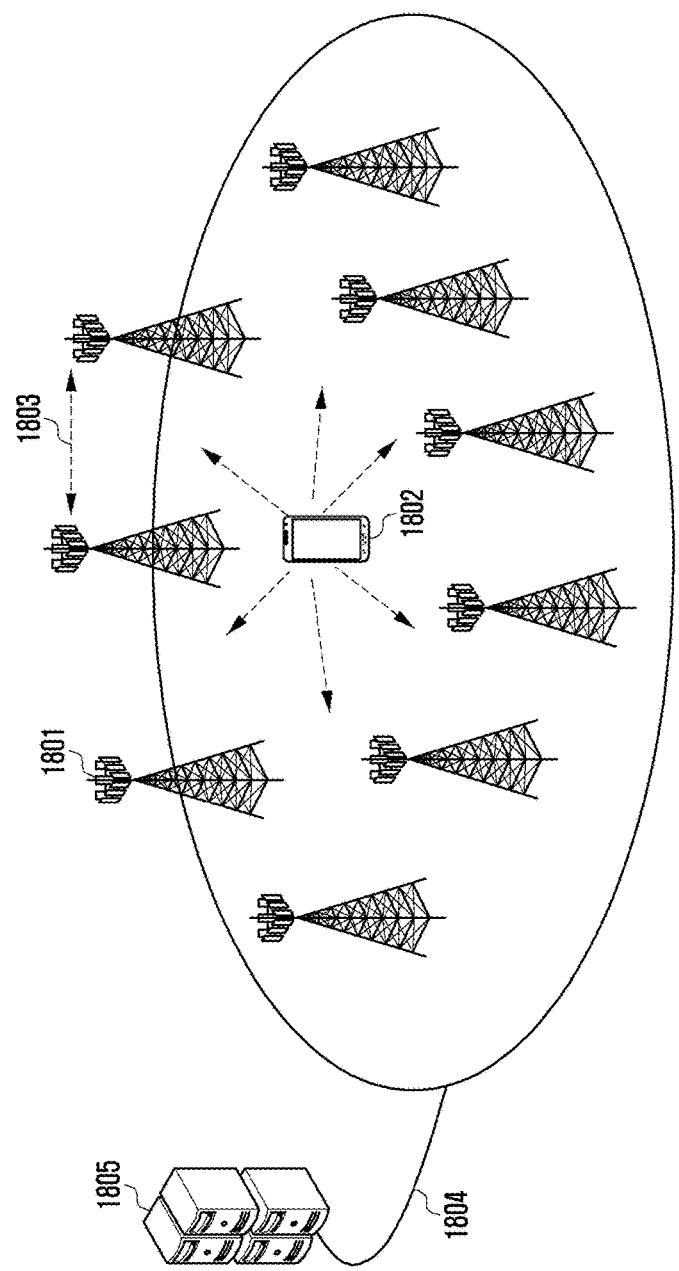
FIG. 18 is a schematic diagram illustrating the principle of uplink transmission in a distributed multi-antenna system in accordance with an example of the present disclosure.

FIG. 18 is a schematic diagram illustrating the principle of uplink transmission in a distributed multi-antenna system in accordance with an example of the present disclosure. As shown in FIG. 18, during uplink transmission, multiple base stations 1801 receive an uplink FBMC/OQAM signal transmitted by a UE 1802. The base stations and the UE are respectively configured with $N_R$ ($N_R \geq 1$) receive antennas and $N_T$ ($N_T \geq 1$) transmit antennas. The base stations communicate with each other via standard interfaces 1803. Each base station may also be connected to a network central processor 1805 via a fibre backhaul network 1804. It can be seen that if the number of base stations $N_{BS}$ that receive the uplink signal is larger than 1, the distributed multi-antenna system shown in FIG. 18 may be regarded as a virtual MIMO system having $N_T$ transmit antennas and $N_{BS}N_R$ receive antennas. Therefore, any of the iterative interference cancellation methods of embodiments one, two, three and four may be used for eliminating the ISI/ICI in a received uplink FBMC/OQAM signal of the distributed multi-antenna system as shown in FIG. 18. In an example, when the number of receive antennas $N_{BS}N_R$ is relatively large or the number of transmit antennas $N_T$ is relatively large, or the total number of receive antennas $N_{BS}N_R$ and transmit antennas $N_T$ is relatively large, the design method of the iterative interference cancellation receiver of embodiment four can be used. Otherwise, the design method of the iterative interference cancellation receiver of any of embodiments one, two and three can be used. Overall, base stations are required to exchange necessary system information to make the necessary condition of the iterative interference cancellation algorithm of embodiments one, two, three and four satisfied, so as to implement the iterative interference cancellation of ISI/ICI in the received uplink FBMC/OQAM signal in the virtual MIMO system as shown in FIG. 18. In addition, base band processing functions of the base stations may be configured flexibly according to the exchanged information.

Figure 19:
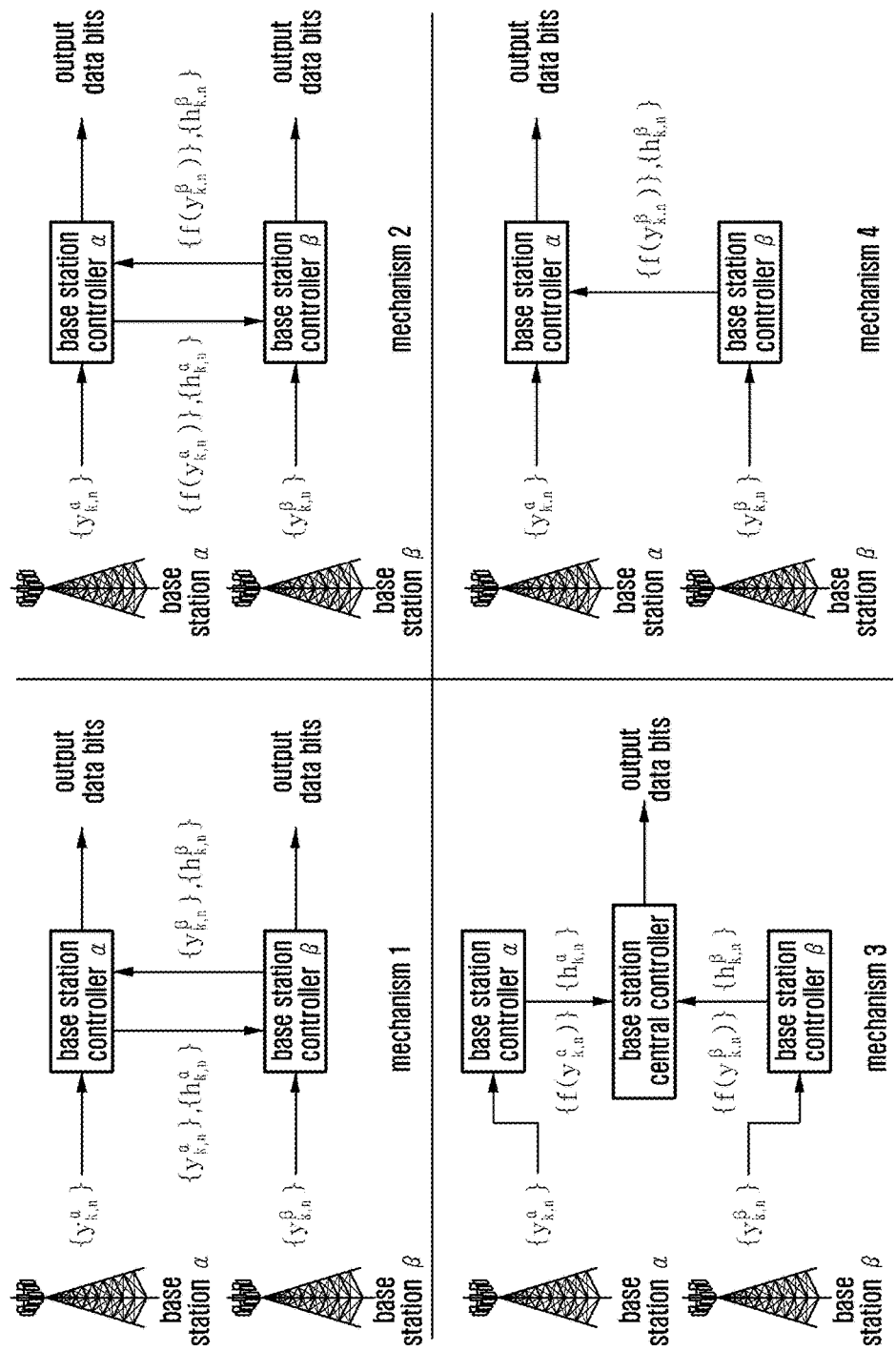
FIG. 19 is schematic diagrams illustrating mechanisms and processes of uplink iterative interference cancellation in a distributed multi-antenna system in accordance with embodiment five of the present disclosure.

FIG. 19 is schematic diagrams illustrating mechanisms and processes of uplink iterative interference cancellation in a distributed multi-antenna system in accordance with embodiment five of the present disclosure. As shown in FIG. 19, the uplink iterative interference cancellation of the distributed multi-antenna system of embodiment five may include four mechanisms. The mechanisms are described with reference to two base stations (e.g., base station α and base station β).

Mechanism one: base station α and base station β exchange match filtered received signal $\{y_{k,n}^{\alpha}\}$, $\{y_{k,n}^{\beta}\}$ and channel state information $\{h_{k,n}^{\alpha}\}$ and $\{h_{k,n}^{\beta}\}$ via base station controller α and base station controller β. The expression of $\{y_{k,n}^{\alpha}\}$ and $\{y_{k,n}^{\alpha}\}$ are the same with the expression of $\{y_{k,n}^{MIMO}\}$ of embodiment four. Base station controller α and base station controller β synthesize the $\{y_{k,n}^{\alpha}\}$ and the $\{y_{k,n}^{\alpha}\}$, select one of the iterative interference cancellation receivers of embodiments one to four based on whether system configurations (e.g., the number of transmit/receive antennas and the number of sub-carriers and the like) satisfy the necessary condition required by the iterative interference cancellation algorithm of embodiments one to four, cancel residual ISI/ICI in received FBMC/OQAM signal using exchanged channel state information $\{h_{k,n}^{\alpha}\}$ and $\{h_{k,n}^{\beta}\}$, and output data bits.

Mechanism two: base station α and base station β exchange post-processed signal $\{f(y_{k,n}^{\alpha})\}$ and $\{f(y_{k,n}^{\beta})\}$ of match filtered received signal $\{y_{k,n}^{\alpha}\}$, $\{y_{k,n}^{\beta}\}$ via base station controller α and base station controller β. In addition, the exchanged information also includes channel state information $\{h_{k,n}^{\alpha}\}$ and $\{h_{k,n}^{\beta}\}$. The operation f(•) may be implemented by any module in the iterative interference cancellation algorithm of any of embodiments one to four, e.g., by the elementary signal estimator 301 of embodiment one, or the soft decoding module 304, or the like. Further, the base station controllers α and β may perform iterative procedures to exchange $\{f(y_{k,n}^{\alpha})\}$ and $\{f(y_{k,n}^{\beta})\}$ according to contents of $\{f(y_{k,n}^{\alpha})\}$ and $\{f(y_{k,n}^{\beta})\}$. Base station controller α and base station controller β synthesize the $\{f(y_{k,n}^{\alpha})\}$ and the $\{f(y_{k,n}^{\beta})\}$, select one of the iterative interference cancellation receivers of embodiments one to four based on whether system configurations (e.g., the number of transmit/receive antennas and the number of sub-carriers and the like) satisfy the necessary condition required by the iterative interference cancellation algorithm of embodiments one to four, cancel residual ISI/ICI in received FBMC/OQAM signal using exchanged channel state information $\{h_{k,n}^{\alpha}\}$ and $\{h_{k,n}^{\beta}\}$, and output data bits.

Mechanism three: base station controllers α and β send post-processed signal $\{f(y_{k,n}^{\alpha})\}$ and $\{f(y_{k,n}^{\beta})\}$ of the matched filtered received signal $\{y_{k,n}^{\alpha}\}$ and $\{y_{k,n}^{\beta}\}$ to the base station central controller which implements interference cancellation and outputs data bits. In an example, the location of the base station central controller may be the same with the network central processor 1805 as shown in FIG. 18. In an example, the information sent may also include the channel state information $\{h_{k,n}^{\alpha}\}$ and $\{h_{k,n}^{\beta}\}$. The operation f(•) may be implemented by any module in the iterative interference cancellation algorithm of any of embodiments one to four, e.g., by the elementary signal estimator 301 of embodiment one, or the soft decoding module 304, or the like.

Further, the base station controllers α and β may perform iterative procedures to exchange $\{f(y_{k,n}^{\alpha})\}$ and $\{f(y_{k,n}^{\beta})\}$ according to contents of $\{f(y_{k,n}^{\alpha})\}$ and $\{f(y_{k,n}^{\beta})\}$.

Base station central controller may synthesize the $\{f(y_{k,n}^{\alpha})\}$ and the $\{f(y_{k,n}^{\beta})\}$, select one of the iterative interference cancellation receivers of embodiments one to four based on whether system configurations (e.g., the number of transmit/receive antennas and the number of sub-carriers and the like) satisfy the necessary condition required by the iterative interference cancellation algorithm of embodiments one to four, cancel residual ISI/ICI in received FBMC/OQAM signal using exchanged channel state information $\{h_{k,n}^{\alpha}\}$ and $\{h_{k,n}^{\beta}\}$, and output data bits.

Mechanism four: base station β sends a post-processed signal $\{f(y_{k,n}^{\alpha})\}$ of match filtered received signal $\{y_{k,n}^{\beta}\}$ via base station controller β to base station controller α in base station α. In addition, the information sent may also include channel state information $\{h_{k,n}^{\beta}\}$. That is, base station α is the main base station, and base station β is a controlled base station. The operation f(•) may be implemented by any module in the iterative interference cancellation algorithm of any of embodiments one to four, e.g., by the elementary signal estimator 301 of embodiment one, or the soft decoding module 304, or the like. Further, base station controller β may send the $\{f(y_{k,n}^{\beta})\}$ using iterative procedures according to contents of $\{f(y_{k,n}^{\beta})\}$. Base station controller α may synthesize the $\{f(y_{k,n}^{\alpha})\}$ and the $\{f(y_{k,n}^{\beta})\}$, select one of the iterative interference cancellation receivers of embodiments one to four based on whether system configurations (e.g., the number of transmitting/receiving antennas and the number of sub-carriers and the like) satisfy the necessary condition required by the iterative interference cancellation algorithm of embodiments one to four, cancel residual ISI/ICI in received FBMC/OQAM signal using the received channel state information $\{h_{k,n}^{\beta}\}$ and the local channel state information $\{h_{k,n}^{\alpha}\}$, and output data bits.

Various embodiments also provide an interference cancellation method corresponding to the above embodiment. The method may include the following procedures:

step 1: calculating a mean value and a variance of a received signal to obtain statistics information of the received signal;

step 2: calculating an estimating log-likelihood ratio of the received signal using the statistics information;

step 3: calculating a decoding log-likelihood ratios of the received signal using the estimating log-likelihood ratio of the received signal, and performing calculations to update the statistics information of the received signal;

step 4: repeating the steps 1-3 for a pre-determined number of times, and outputting data bits obtained through hard decision operations.

The method of calculating a mean value and a variance of received signal in step 1 may include two manners:

manner 1: calculating a mean value and a variance of the received signal after anti-interference post-processing;

manner 2: calculating a mean value and a variance of the received signal after anti-interference pre-processing.

In manner 1, the following actions may be performed to obtain the received signal after anti-interference post-processing:

processing the received signal through matched filtering, channel equalization, synthesizing, and taking real parts to obtain an initialized signal;

processing the initialized signal through a symbol-level hard decision based on the minimum Euclidean distance to obtain a hard-decision signal;

processing the hard-decision signal through demodulation, parallel to serial conversion, de-interleaving and channel decoding to obtain a processed signal, processing the processed signal through channel encoding, interleaving, serial to parallel conversion, QAM modulation and a taking real/imaginary part operation to obtain an estimated signal;

performing initial interference cancellation using the initialized signal and the estimated signal to obtain the received signal after the anti-interference post-processing.

In manner 2, the following actions may be performed to obtain the received signal after anti-interference pre-processing:

processing the received signal through matched filtering to obtain a filtered signal; processing the filtered signal through channel equalization, synthesizing and a taking imaginary part operation to obtain estimated interference in the initialized signal;

performing initial interference cancellation using the filtered signal and the estimated interference to obtain the received signal after initial anti-interference pre-processing;

applying soft demodulation/decision to the received signal after the initial anti-interference pre-processing to obtain a posteriori log-likelihood ratio of the received signal;

processing the posteriori log-likelihood ratio through parallel to serial conversion, de-interleaving and channel decoding to obtain a processed signal, and processing the processed signal through channel encoding, interleaving, serial to parallel conversion, QAM modulation and taking real/imaginary parts to obtain the received signal after the anti-interference pre-processing.

Corresponding to the above interference cancellation method, various embodiments also provide an apparatus for interference cancellation. The apparatus may include: a first module, a second module, a third module and an iteration module, the first module is configured for calculating a mean value and a variance value of a received signal to obtain statistics information of the received signal;

the second module is configured for calculating an estimating log-likelihood ratio of the received signal using the statistics information;

the third module is configured for calculating a decoding log-likelihood ratios of the received signal using the estimating log-likelihood ratio of the received signal, and performing calculations to update the statistics information of the received signal;

the iteration module is configured for making the first module, the second module and the third module repeat the operations for a pre-determined number of times, and outputting data bits obtained from hard decisions.

The above embodiments 1-5 describe the design methods, work flows and applications in a distributed multi-antenna system of the iterative interference cancellation receiver of the present disclosure. Embodiment six mainly describes signaling exchange procedures and work flows between a base station and a UE to assist the implementation of the iterative interference cancellation receiver at the base station side.

Embodiment Six

Figure 20:
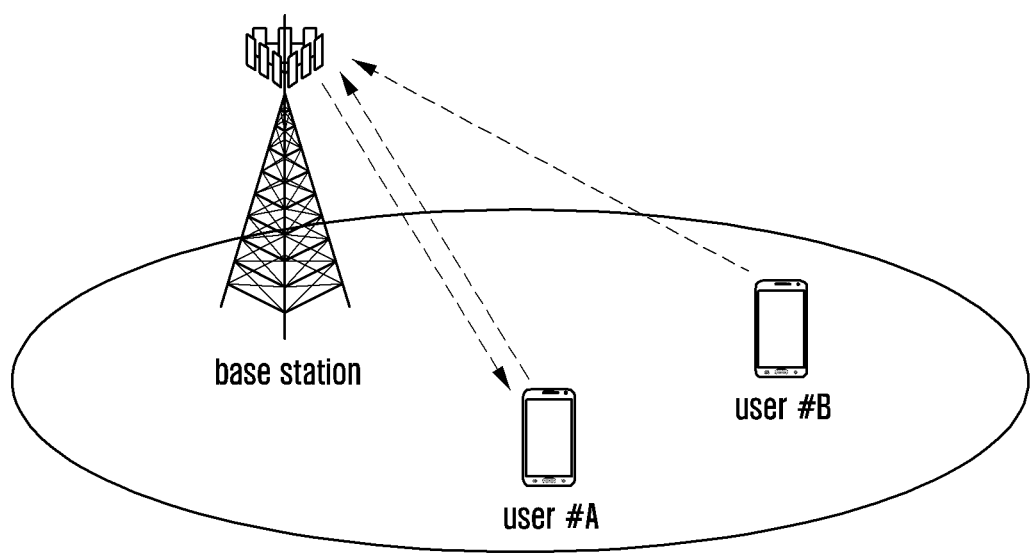
FIG. 20 is a schematic diagram illustrating uplink and downlink communication between a base station and a UE in accordance with embodiment six of the present disclosure.

As shown in FIG. 20, a base station and UE #A communicate with each other via an uplink channel and a downlink channel respectively. The base station may configure transmitting parameter of the UE according to channel state information, a parameter of a configurable transmission mode and a configurable parameter of a synthesis filter bank fed back by the UE and antenna configuration information, base band processing capabilities of the base station and QoS requirements of the network side.

The transmission mode may include multiple parameters and combinations of parameters. Configurations and values of some parameters of the transmission mode may have impact on the interference cancellation operations in the system. The interference cancellation operations are performed on the base station side, thus the UE may report to the base station all transmission mode configuration information that may have potential impact on the interference cancellation operations of the base station, i.e., the UE needs to report "configurable transmission mode information" to the base station. Then the base station informs the UE of the configured transmission mode, and the UE configures the transmission mode according to transmission mode information sent by the base station.

The channel state information may include one or multiple of: a narrow-band channel quality indicator (CQI), a precoding matrix indicator and a rank indicator. The configurable transmission mode parameter may include the number of transmit antennas of the UE, supported MIMO transmission mode, terminal type and the like. The configurable synthesis filter bank parameter may include: the type and category of the synthesis filter bank available in the UE, configuration parameter of the synthesis filter bank, and the like. In addition, the transmission parameters of the UE may include, but are not limited to, configurations of the transmission mode and parameters of the synthesis filter bank.

Figure 21:
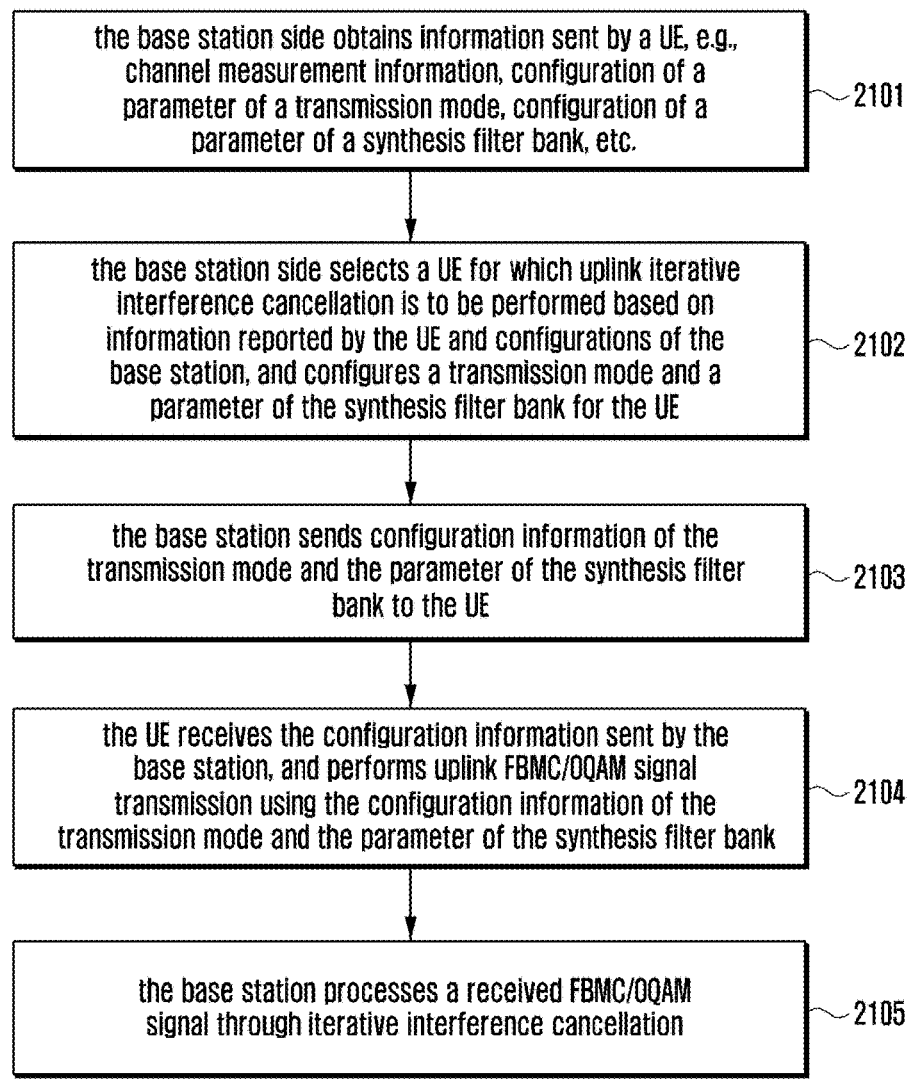
FIG. 21 is a flowchart illustrating a process of a base station and a UE communicating with each other to assist the base station in implementing an iterative interference cancellation receiver in accordance with embodiment six of the present disclosure.

FIG. 21 is a flowchart illustrating a process of a base station and a UE communicating with each other to assist the base station in implementing an iterative interference cancellation receiver in accordance with embodiment six of the present disclosure. As shown in FIG. 21, the method includes the following steps.

At block 2101, a UE measures channel state information, and reports the channel state information to the base station. The UE may also report information of a configurable transmission mode, information of a configurable parameter of a synthesis filter bank and the like to the base station. The information of the configurable transmission mode and the information of the configurable parameter of the synthesis filter bank may include configurable information of the UE.

At block 2102, the base station selects a UE for which uplink iterative interference cancellation is to be performed according to the channel state information fed back by UEs. The base station may configure a preferred transmission mode and a preferred parameter of the synthesis filter bank using the information of the configurable transmission mode and the configurable parameter of the synthesis filter bank reported by the UEs and using antenna configuration information and resource allocation information of the base station.

At block 2103, the base station transmits the configuration information to the selected UE via a downlink control channel.

At block 2104, the UE transmits an FBMC/OQAM signal via an uplink channel using the transmission mode and the synthesis filter bank parameter configured by the base station.

At block 2105, the base station applies iterative interference cancellation operations to the received FBMC/OQAM signal.

The UE may also use a time division manner to report the channel state information, the information of configurable transmission mode and configurable synthesis filter bank and so on to the base station. For example, the UE may first feed back the channel state information. The base station may select the UE for which the uplink iterative interference cancellation operations are to be performed after obtaining the channel state information. The base station may instruct the selected UE via a downlink control channel to report the configurable transmission mode and the configurable synthesis filter bank parameter and the like of the selected UE. This can remarkably reduce redundancy data in uplink channel. In an example, the base station and the UE may look up a table to obtain the configurable transmission mode and the configurable synthesis filter bank parameter reported by the UE and the configuration information transmitted by the base station regarding the transmission mode and the synthesis filter bank parameter.

Figure 22:
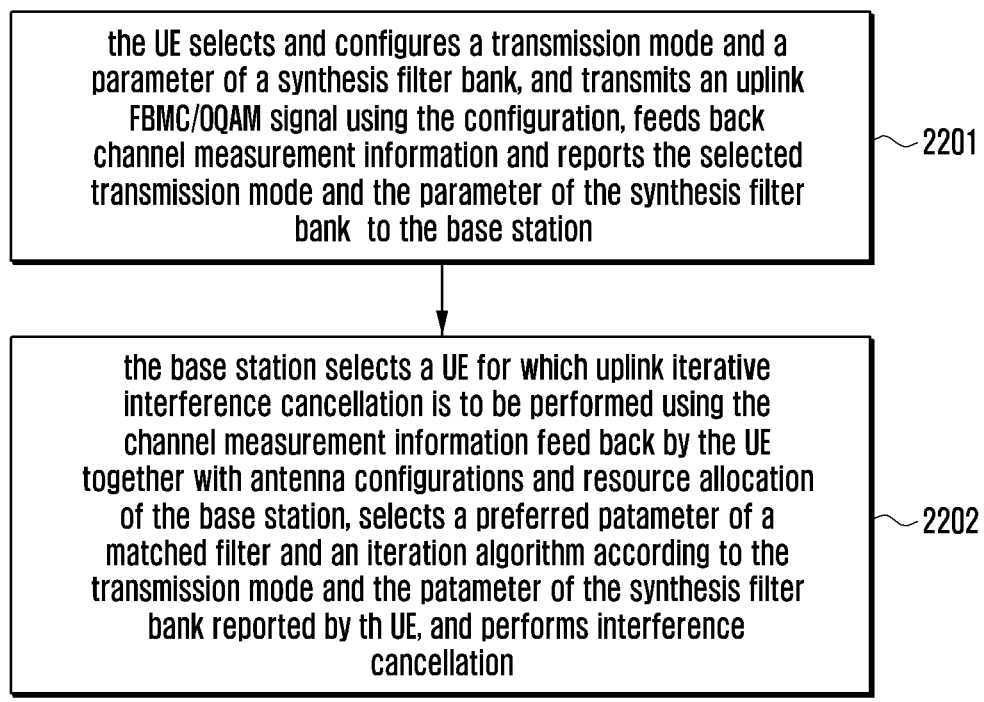
FIG. 22 is a flowchart illustrating a process initiated by a UE to assist the base station in implementing an iterative interference cancellation receiver in accordance with embodiment six of the present disclosure.

Blocks 2101 to 2105 illustrates the process of a base station communicates with a UE to assist in implementing the iterative interference cancellation receiver at the base station side. In an example, the iterative interference cancellation procedures on the base station side may also be initiated and assisted by the sending side (i.e., the UE). As shown in FIG. 20, a base station and UE #A communicate with each other via an uplink channel and a downlink channel respectively. As shown in FIG. 22, the communication process may include the following procedures.

At block 2201, a UE selects and configures a transmission mode and a parameter of a synthesis filter bank and the like. The UE transmits an uplink FBMC/OQAM signal according to the selected transmission mode and the parameter of the synthesis filter bank. The UE feeds back channel state information to a base station, and reports the selected transmission mode and the parameter of the synthesis filter bank to the base station.

Figure 23:
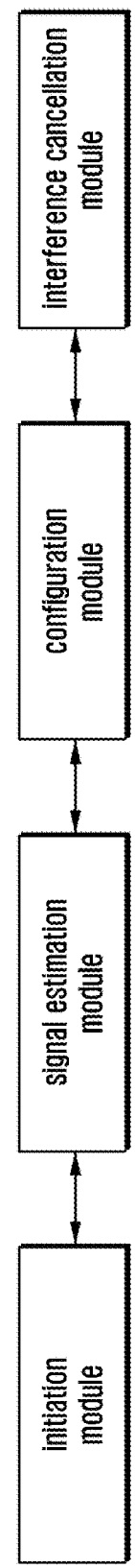
FIG. 23 is a schematic diagram illustrating modules of a preferred receiver in accordance with an embodiment of the present disclosure.

At block 2202, the base station selects a UE for which uplink iterative interference cancellation operations are to be performed based on the channel state information fed back by the UE, antenna configuration information and resource allocation information of the base station. The base station selects a preferred parameter of a matched filter and a preferred iteration algorithm based on the transmission mode and the parameter of the synthesis filter bank reported by the UE, and performs interference cancellation operations FIG. 23 is a schematic diagram illustrating modules of a preferred receiver. The receiver may include an initialization module, a signal estimation module, a configuration module and an interference cancellation module.

The initialization module is configured for processing a received signal through matched filtering, sub-channel/sub-carrier equalization and real/imaginary part conversion and the like.

The signal estimation module is configured for estimating a signal in an iterative interference cancellation process.

The interference cancellation module is configured for performing interference cancellation on the received signal.

The configuration module is configured for configuring interoperations of the signal estimation module and the interference cancellation module.

Figure 24:
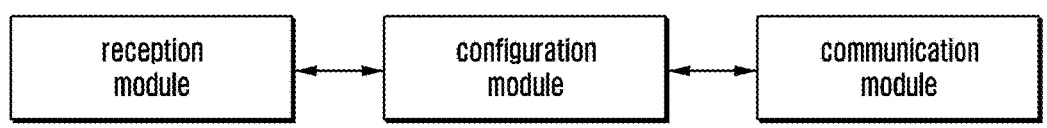
FIG. 24 is a schematic diagram illustrating modules of a preferred base station in accordance with an embodiment of the present disclosure.

FIG. 24 is a schematic diagram illustrating modules of a preferred base station in accordance with an embodiment of the present disclosure. The base station may include a reception module, a configuration module and a communication module.

The reception module is configured for processing a received signal through initialization, channel estimation and interference cancellation, receiving measurement information and configuration information transmitted by a UE.

The configuration module is configured for configuring a function mode of a base band unit, configuring a transmission parameter of a UE according to the measurement information and the configuration information reported by the UE, configuring a parameter of a filter selected in the base station and parameter of an iterative interference cancellation process.

The communication module is configured for communicating with the UE, and communicating with another base stations via standard interfaces.

Figure 25:
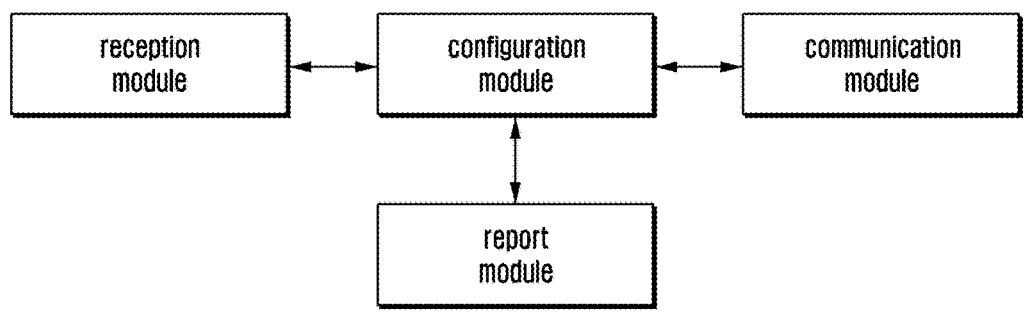
FIG. 25 is a schematic diagram illustrating modules of a preferred UE in accordance with an embodiment of the present invention.

FIG. 25 is a schematic diagram illustrating modules of a preferred UE in accordance with an embodiment of the present disclosure. The UE may include a reception module, a configuration module and a communication module.

The reception module is configured for receiving configuration information transmitted by a base station which includes, but is not limited to, configuration information of a transmission mode and a parameter of a synthesis filter.

The configuration module is configured for configuring transmission parameters of the UE which include, but are not limited to, the transmission mode and the parameters of the synthesis filter.

The reporting module is configured for reporting channel state information, information of a configurable transmission mode and a configurable parameter of the synthesis filter, a currently-used transmission module and a currently-used parameter of the synthesis filter and the like.

The communication module is configured for communicating with the base station.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for interference cancellation by an apparatus in a mobile communication system, comprising:
    calculating a mean value and a variance value of a received signal to obtain statistics information of the received signal;
    calculating an estimating log-likelihood ratio of the received signal using the statistics information, based on an initialized signal at a target time-frequency grid point, a source signal at the target time-frequency grid point, and a transmitted real symbol;
    calculating a decoding log-likelihood ratio of the received signal using the estimating log-likelihood ratio of the received signal, and updating calculations of the statistics information of the received signal;
    repeating calculating the mean value and the variance value, calculating the estimating log-likelihood ratio, and calculating the decoding log-likelihood ratio for a pre-determined number of times, and performing hard decisions on the decoding log-likelihood ratio of the received signal; and
    outputting data bits obtained from the hard decisions,
    wherein the method further comprises canceling, by the apparatus, inter-symbol interference (ISI) and inter-carrier interference (ICI) in a single input single output (SISO) filter bank multi-carrier (FBMC)/offset quadrature amplitude modulation (OQAM) system or in a multi input multi output (MIMO) FBMC/OQAM system or in a distributed multi-antenna FBMC/OQAM system.

2. The method of claim 1, wherein
the calculating a mean value and a variance value of a received signal comprises one of:
calculating a mean value and a variance value of the received signal after interference post-processing; and
calculating a mean value and a variance value of the received signal after interference pre-processing.

3. The method of claim 2, further comprising the following steps to obtain the received signal after interference post-processing:
processing the received signal through matched filtering, channel equalization, synthesizing, and taking real part to obtain an initialized signal;
processing the initialized signal through symbol-level hard decisions based on minimum Euclidean distance to obtain a hard decision signal;
processing the hard decision signal through demodulation, parallel to serial conversion, de-interleaving and channel decoding to obtain a processed signal, processing the processed signal through channel encoding, interleaving, serial to parallel conversion, QAM modulation and taking real/imaginary part to obtain an estimated signal; and
performing initial interference cancellation using the initialized signal and the estimated signal to obtain the received signal after the interference post-processing.

4. The method of claim 3, wherein the initial interference cancellation is expressed as:

$$\tilde{d}'_{k_0,n_0} = \tilde{d}_{k_0,n_0} - \Re\left\{ \sum_{n_r=1}^{N_R} \sum_{n_t=1}^{N_T} \sum_{(k,n)\in\Omega_{(k_0,n_0)}} \hat{d}'_{k,n} (\phi^{(n_t,n_r)}_{k_0,n_0})^* h^{(n_t,n_r)}_{k,n} \sum_{m=-\infty}^{\infty} g_{k,n}[m] f_{k_0,n_0}[m] \right\},$$

wherein $(k_0, n_0)$ is a target time-frequency grid point, $(k,n)$ is a neighboring time-frequency grid point of the target time-frequency grid point, $\Re\{\cdot\}$ denotes taking a real part, $\tilde{d}'_{k_0,n_0}$ is a signal after interference post-processing at the target time-frequency grid point, $\tilde{d}_{k_0,n_0}$ is an initialized signal of the target time-frequency grid point $(k_0, n_0)$, $\hat{d}'_{k,n}$ is an estimated signal at a time-frequency grid point $(k,n)$, $h^{(n_t,n_r)}_{k,n}$ is a frequency response of a channel between a receive antenna $n_r$ and a transmit antenna $n_t$ at the time-frequency grid point $(k,n)$, $\phi^{(n_t,n_r)}_{k_0,n_0}$ is a channel equalization coefficient of the channel between the receive antenna $n_r$ and the transmit antenna $n_t$ at the time-frequency grid point $(k_0, n_0)$, $g_{k,n}[m]$ is a filtering function of a synthesis filter at the time-frequency grid point $(k,n)$, $f_{k_0,n_0}[m]$ is a filtering function of an analysis filter at the time-frequency grid point $(k_0, n_0)$, m is a sampling index of a filter, $N_T$ ($N_T \geq 1$) is a number of transmit antennas, $N_R$ ($N_R \geq 1$) is a number of receive antennas, $\Omega_{k_0, n_0}$ is a neighborhood of the target time-frequency grid point $(k_0, n_0)$.

5. The method of claim 4, wherein the initial interference cancellation includes an iterative process.

6. The method of claim 2, further comprising the following steps to obtain the received signal after interference pre-processing:
processing the received signal through matched filtering to obtain a filtered signal; processing the filtered signal through channel equalization, synthesizing and taking imaginary part to obtain estimated interference in the initialized signal;
performing initial interference cancellation operations using the filtered signal and the estimated interference to obtain the received signal after initial interference pre-processing;
performing soft demodulation/decision on the received signal after the interference pre-processing to obtain a posteriori log-likelihood ratio of the received signal; and
processing the posteriori log-likelihood ratio through parallel to serial conversion, de-interleaving and channel decoding to obtain a processed signal, and processing the processed signal through channel encoding, interleaving, serial to parallel conversion, QAM modulation and taking real/imaginary part to obtain the received signal after the interference pre-processing.

7. The method of claim 6, wherein the initial interference cancellation is expressed as:

$$\bar{y}_{k_0,n_0} = y_{k_0,n_0} - \sum_{n_r=1}^{N_R} \sum_{n_t=1}^{N_T} \sum_{(k,n)\in\Omega_{(k_0,n_0)}} j h^{(n_t,n_r)}_{k,n} \tilde{u}_{k_0,n_0},$$

wherein $(k_0, n_0)$ is a target time-frequency grid point, $(k,n)$ is a neighboring time-frequency grid point of the target time-frequency grid point, $\bar{y}_{k_0, n_0}$ is a signal after the initial interference pre-processing at the time-frequency grid point $(k_0, n_0)$, $y_{k_0, n_0}$ is a filtered signal at the target time-frequency grid point $(k_0, n_0)$, $h^{(n_t,n_r)}_{k,n}$ is a frequency response of a channel between a receive antenna $n_r$ and a transmit antenna $n_t$ at the time-frequency grid point $(k,n)$, $\tilde{u}_{k_0,n_0}$ is the estimated interference in the initialized signal at the time-frequency grid point $(k_0, n_0)$, $N_T$ ($N_T \geq 1$) is a number of transmit antennas, $N_R$ ($N_R \geq 1$) is a number of receive antennas, $\Omega_{k_0,n_0}$ is a neighborhood of the target time-frequency grid point $(k_0, n_0)$.

8. The method of claim 7, wherein the initial interference cancellation comprises an iterative process.

9. The method of claim 1, wherein
the calculating the estimating log-likelihood ratio of the received signal in calculating the estimating log-likelihood ratio is expressed as:

$$\Xi(b_{k_0,n_0}(u)) = \log\left[\frac{\sum_{\{q_u=+1|q\in 1,2,\ldots,2^Q\}} P(\tilde{d}_{k_0,n_0} \mid d_{k_0,n_0} = a_q)}{\sum_{\{q_u=-1|q\in 1,2,\ldots,2^Q\}} P(\tilde{d}_{k_0,n_0} \mid d_{k_0,n_0} = a_q)}\right]$$

wherein
$$P(\tilde{d}_{k_0,n_0} \mid d_{k_0,n_0} = a_q) =$$

$$\sum_{(k,n)\in\Omega_{k_0,n_0}} \left\{ \frac{1}{[2\pi \mathrm{Var}(\Re\{\xi_{k_0,n_0}\})]^{1/2}} \times \exp\left[-\frac{\left(\tilde{d}_{k_0,n_0} - E(\Re(\xi_{k_0,n_0})) - \sum_{n_r=1}^{N_R}\sum_{n_t=1}^{N_T} |\phi^{(n_t,n_r)}_{k_0,n_0}|^2 a_q\right)^2}{2\mathrm{Var}(\Re\{\xi_{k_0,n_0}\})}\right] \prod_{(k,n)\in\Omega_{k_0,n_0}} P(d_{k,n} = a_q) \right\},$$

-continued wherein $$P(d_{k,n} = a_q) = \prod_{u=1,2,\ldots,Q; q_u \in +1,-1} P(b_{k,n}(u) = q_u), (k_0, n_0)$$

is a target time-frequency grid point, (k,n) is a neighboring time-frequency grid point of the target time-frequency grid point, $\Xi(b_{k_0,n_0}(u))$ is the estimating log-likelihood ratio of a u-th bit $b_{k_0,n_0}(u)$ in the source signal $d_{k_0,n_0}$ at the target time-frequency grid point $(k_0, n_0)$, $\tilde{d}'_{k_0,n_0}$ is the initialized signal at the target time-frequency grid point $(k_0, n_0)$, $a_q$ is the transmitted real symbol and $a_q = 2^Q - 2q + 1$, $q = 1, 2, \ldots, 2^Q$, Q is the order of a QAM modulator, a positive and negative binary sequence of $a_q$ is $l_2(a_q) = q_1 q_2 \ldots q_Q$, $q_u \in (+1,-1)$, $\forall_u \in 1, 2, \ldots Q$, $\phi_{k_0,n_0}^{(n_t,n_r)}$ is a channel equalization coefficient of a channel between a receive antenna $n_r$ and a transmit antenna $n_t$ at the time-frequency grid point $(k_0, n_0)$, $d_{k,n}$ is a source signal at the time-frequency grid point (k,n), $b_{k,n}(u)$ is a u-th bit of the source signal $d_{k,n}$ at the time-frequency grid point (k,n), $N_T$ ($N_T \geq 1$) is a number of transmit antennas, $N_R$ ($N_R \geq 1$) is a number of receive antennas, $\Omega_{k_0, n_0}$ is a neighborhood of the target time-frequency grid point $(k_0, n_0)$, $E(R\{\xi_{k_0,n_0}\})$ and $Var(R\{\xi_{k_0,n_0}\})$ and are respectively expressed as:

$$E(R\{\xi_{k_0,n_0}\}) = E\left(\sum_{n_r=1}^{N_R}\sum_{n_t=1}^{N_T} (\phi_{k_0,n_0}^{(n_t,n_r)})^{Re}(y_{k_0,n_0}^{n_r})^{Re}\right) +$$

$$E\left(\sum_{n_r=1}^{N_R}\sum_{n_t=1}^{N_T} (\phi_{k_0,n_0}^{(n_t,n_r)})^{Im}(y_{k_0,n_0}^{n_r})^{Im}\right) - \varphi_{k_0,n_0} E(d_{k_0,n_0})$$

wherein $$E\left(\sum_{n_r=1}^{N_R}\sum_{n_t=1}^{N_T} (\phi_{k_0,n_0}^{(n_t,n_r)})^{Re}(y_{k_0,n_0}^{n_r})^{Re}\right) = \left(\sum_{n_r=1}^{N_R}\sum_{n_t=1}^{N_T} ((\phi_{k_0,n_0}^{(n_t,n_r)})^{Re})^2\right) E(d_{k_0,n_0}) -$$

$$\sum_{(k,n)\in\Omega_{k_0,n_0}} E(d_{k,n})\delta_{(k,n),(k_0,n_0)} \sum_{n_r=1}^{N_R}\sum_{n_t=1}^{N_T} ((\phi_{k_0,n_0}^{(n_t,n_r)})^{Re}(h_{k,n}^{(n_t,n_r)})^{Im}),$$

$$E\left(\sum_{n_r=1}^{N_R}\sum_{n_t=1}^{N_T} (\phi_{k_0,n_0}^{(n_t,n_r)})^{Im}(y_{k_0,n_0}^{n_r})^{Im}\right) = \left(\sum_{n_r=1}^{N_R}\sum_{n_t=1}^{N_T} ((\phi_{k_0,n_0}^{(n_t,n_r)})^{Im})^2\right) E(d_{k_0,n_0}) -$$

$$\sum_{(k,n)\in\Omega_{k_0,n_0}} E(d_{k,n})\delta_{(k,n),(k_0,n_0)} \sum_{n_r=1}^{N_R}\sum_{n_t=1}^{N_T} ((\phi_{k_0,n_0}^{(n_t,n_r)})^{Im}(h_{k,n}^{(n_t,n_r)})^{Re}),$$

and $$Var(R\{\xi_{k_0,n_0}\}) =$$

$$Var\left(\sum_{n_r=1}^{N_R}\sum_{n_t=1}^{N_T} (\phi_{k_0,n_0}^{(n_t,n_r)})^{Re}(y_{k_0,n_0}^{n_r})^{Re}\right) + Var\left(\sum_{n_r=1}^{N_R}\sum_{n_t=1}^{N_T} (\phi_{k_0,n_0}^{(n_t,n_r)})^{Im}(y_{k_0,n_0}^{n_r})^{Im}\right) +$$

$$2\sum_{n_r=1}^{N_R}\sum_{n_t=1}^{N_T} (\phi_{k_0,n_0}^{(n_t,n_r)})^{Re}(\phi_{k_0,n_0}^{(n_t,n_r)})^{Im} \Psi_{(k,n),(k_0,n_0)}^{n_r} - \varphi_{k_0,n_0}^2 Var(d_{k_0,n_0}),$$

wherein $\Psi_{(k,n)(k_0,n_0)}^{n_r}$ is a covariance of $(y_{k_0,n_0}^{n_r})^{Re}$ and $(y_{k_0,n_0}^{n_r})^{Im}$, and is calculated according to:

$$\Psi_{(k,n),(k_0,n_0)}^{n_r} = \sum_{n_t=1}^{N_T} ((h_{k_0,n_0}^{(n_t,n_r)})^{Re}(h_{k_0,n_0}^{(n_t,n_r)})^{Im}) Var(d_{k_0,n_0}) -$$

$$\sum_{(k,n)\in\Omega_{k_0,n_0}} Var(d_{k,n})\delta_{(k,n),(k_0,n_0)}^2 \sum_{n_t=1}^{N_T} ((h_{k,n}^{(n_t,n_r)})^{Re}(h_{k,n}^{(n_t,n_r)})^{Im}),$$

and $$Var\left(\sum_{n_r=1}^{N_R}\sum_{n_t=1}^{N_T} (\phi_{k_0,n_0}^{(n_t,n_r)})^{Re}(y_{k_0,n_0}^{n_r})^{Re}\right) =$$

$$\left(\sum_{n_r=1}^{N_R}\sum_{n_t=1}^{N_T} (\phi_{k_0,n_0}^{(n_t,n_r)})^{Re}(h_{k_0,n_0}^{n_t,n_r})^{Re}\right)^2 Var(d_{k_0,n_0}) -$$

$$\sum_{(k,n)\in\Omega_{k_0,n_0}} Var(d_{k,n})\delta_{(k,n),(k_0,n_0)}^2 \left(\sum_{n_r=1}^{N_R}\sum_{n_t=1}^{N_T} ((\phi_{k_0,n_0}^{(n_t,n_r)})^{Re}(h_{k,n}^{(n_t,n_r)})^{Im})\right)^2,$$

$$Var\left(\sum_{n_r=1}^{N_R}\sum_{n_t=1}^{N_T} (\phi_{k_0,n_0}^{(n_t,n_r)})^{Im}(y_{k_0,n_0}^{n_r})^{Im}\right) =$$

$$\left(\sum_{n_r=1}^{N_R}\sum_{n_t=1}^{N_T} (\phi_{k_0,n_0}^{(n_t,n_r)})^{Im}(h_{k_0,n_0}^{n_t,n_r})^{Im}\right)^2 Var(d_{k_0,n_0}) -$$

$$\sum_{(k,n)\in\Omega_{k_0,n_0}} Var(d_{k,n})\delta_{(k,n),(k_0,n_0)}^2 \left(\sum_{n_r=1}^{N_R}\sum_{n_t=1}^{N_T} ((\phi_{k_0,n_0}^{(n_t,n_r)})^{Im}(h_{k,n}^{(n_t,n_r)})^{Re})\right)^2,$$

wherein $h_{k_0,n_0}^{(n_t,n_r)}$ is a frequency response of a channel between a receive antenna $n_r$ and a transmit antenna $n_t$ at the time-frequency grid point $(k_0, n_0)$, $h_{k,n}^{(n_t,n_r)}$ is a frequency response of the channel between the receive antenna $n_r$ and the transmit antenna $n_t$ at the time-frequency grid point (k,n), $R\{\cdot\}$ denotes taking a real part, $(\cdot)^{Re}$ and $(\cdot)^{Im}$ respectively denote a real part and an imaginary part of a complex symbol, $\delta_{(k,n)(k_0,n_0)}$ is an amplitude of $$\sum_{m=-\infty}^{\infty} g_{k,n}[m] f_{k_0,n_0}[m],$$

$g_{k,n}[m]$ is a filtering function of a synthesis filter at the time-frequency grid point (k,n), $f_{k_0, n_0}[m]$ is a filtering function of an analysis filter at the time-frequency grid point $(k_0, n_0)$, m is a sampling index of a filter, $y_{k_0,n_0}^{n_r}$ is a filtered signal of the receive antenna $n_r$ the target time-frequency grid point $(k_0, n_0)$, $$\varphi_{k_0,n_0} = \sum_{n_r=1}^{N_R}\sum_{n_t=1}^{N_T} (\phi_{k_0,n_0}^{(n_t,n_r)})^* h_{k_0,n_0}^{(n_t,n_r)}.$$

10. The method of claim 1, wherein the calculating the decoding log-likelihood ratio of the received signal comprises:

applying a posteriori probability (APP) decoding to the received signal using the estimating log-likelihood ratio of the received signal to obtain a posteriori log-likelihood ratio of the received signal; and calculating the decoding log-likelihood ratio of the received signal using the estimating log-likelihood ratio and the posteriori log-likelihood ratio of the received signal.

11. The method of claim 2, wherein
before a first iterative procedure is performed, calculating the statistics information of the received signal using the received signal after the interference post-processing and/or the received signal after the interference pre-processing.

12. An apparatus for interference cancellation in a mobile communication system, the apparatus comprising: a first signal estimator configured for calculating a mean value and a variance value of a received signal to obtain statistics information of the received signal;
a second signal estimator configured for calculating an estimating log-likelihood ratio of the received signal using the statistics information based on an initialized signal at a target time-frequency grid point, a source signal at the target time-frequency grid point, and a transmitted real symbol;
a soft decoder configured for calculating a decoding log-likelihood ratio of the received signal using the estimating log-likelihood ratio of the received signal, and updating calculations of the statistics information of the received signal; and an iteration controller configured for repeating operations of the first signal estimator, the second signal estimator and the soft decoder, for a pre-determined number of times,
and outputting data bits obtained from hard decisions,
wherein the apparatus is configured to cancel inter-symbol interference (ISI) and inter-carrier interference (ICI) in a single input single output (SISO) filter bank multi-carrier (FBMC)/offset quadrature amplitude modulation (OQAM) system or in a multi input multi output (MIMO) FBMC/OQAM system or in a distributed multi-antenna FBMC/OQAM system.

13. An auxiliary method for interference cancellation, comprising:
obtaining, by a base station, channel state information reported by a user equipment (UP;
selecting, by the base station, a UE for which uplink iterative interference cancellation is to be performed according to the channel state information, instructing the selected UE via a downlink control channel to report information of a configurable transmission mode and a configurable parameter of a synthesis filter bank;
configuring, by the base station, transmission mode parameter and a synthesis filter bank parameter for the UE according to the information of the configurable transmission mode and the configurable parameter of the synthesis filter bank reported by the UE and antenna configuration information and resources allocation information of the base station, and transmitting the configured parameter to the UE via a downlink control channel;
receiving, by the base station, an uplink filter bank multi-carrier (FBMC)/offset quadrature amplitude modulation (OQAM) signal from the UE; and
performing, by the base station, interference cancellation on the received FBMC/OQAM signal.

14. The method of claim 13, wherein:
the channel state information comprises one or multiple of: a channel quality indicator (CQI), a precoding matrix indicator (PMI) and a rank indicator (RI);
the information of the transmission mode comprises: a number of transmit antennas, and information of a MIMO transmission mode; and
the information of the parameter of the synthesis filter bank comprises: information on a type and category of the synthesis filter bank, and information on the configured parameter of the synthesis filter bank.

15. The method of claim 14, wherein:
the information of the configurable transmission mode and information of the configurable parameter of the synthesis filter bank reported by the UE are obtained by the base station by looking up a table; and
the parameter of the transmission mode and the parameter of the synthesis filter bank transmitted by the base station are obtained by the UE by looking up a table.

16. An auxiliary method for interference cancellation, comprising:
selecting and configuring, by a user equipment (UE), a transmission mode and a parameter of a synthesis filter bank;
transmitting, by the UE, an uplink filter bank multi-carrier (FBMC)/offset quadrature amplitude modulation (OQAM) signal using the selected transmission mode and the parameter of the synthesis filter bank;
reporting, by the UE, channel state information and information of the selected transmission mode and the parameter of the synthesis filter bank to a base station;
selecting, by the base station, a UE for which uplink iterative interference cancellation is to be performed according to channel state information reported by the UE and antenna configuration information and resources allocation information of the base station; and
selecting, by the base station, a parameter for a synthesis filter bank and an iterative algorithm according to information of a transmission mode and a parameter of a synthesis filter bank reported by the UE, and applying the method of claim 1 to the FBMC/OQAM signal received.

17. The method of claim 16, wherein: the channel state information comprises one or multiple of: a channel quality indicator (CQI), a precoding matrix indicator (PMI) and a rank indicator (RI);
the information of the transmission mode comprises: a number of transmitting antennas, information of a MIMO transmission mode; and
the information of the parameter of the synthesis filter bank comprises: information on the type and category of the synthesis filter bank, and information on the configured parameter of the synthesis filter bank.

18. A base station, comprising:
a receiver configured for processing a received signal through initialization, channel estimation and interference cancellation, and for receiving measurement information and configuration information transmitted by a user equipment (UE);
a configuration controller is configured for configuring a function mode of a base band unit, configuring a transmission parameter of the UE according to the measurement information and the configuration information reported by the UE, configuring a parameter of a filter selected in the base station and a parameter of an iterative interference cancellation process; and
a transmitter configured for communicating with the UE, and communicating with another base station via a standard interface.

19. A user equipment (UE), comprising:
- a receiver configured for receiving configuration information transmitted by a base station which includes, but not limited to, configuration information of a transmission mode and a parameter of a synthesis filter;
- a controller configured for configuring a transmission parameter of the UE which includes, but is not limited to, a parameter of the transmission mode and a parameter of the synthesis filter; and
- a transmitter configured for reporting channel state information, information of a configurable transmission mode and a configurable parameter of the synthesis filter, a currently-used transmission mode and a currently-used parameter of the synthesis filter.

* * * * *